(12) United States Patent
Asukai et al.

(10) Patent No.: US 9,165,342 B2
(45) Date of Patent: Oct. 20, 2015

(54) IMAGE DATA PROCESSING APPARATUS AND METHOD FOR WRITING AN IMAGE DATA INTO A MEMORY

(71) Applicant: PFU LIMITED, Kahoku-shi, Ishikawa (JP)

(72) Inventors: Miki Asukai, Kahoku (JP); Hideyo Kawara, Kahoku (JP)

(73) Assignee: PFU Limited, Kahoku-shi (JP)

( * ) Notice: Subject to any disclaimer, the term of this patent is extended or adjusted under 35 U.S.C. 154(b) by 0 days.

(21) Appl. No.: 14/156,160

(22) Filed: Jan. 15, 2014

(65) Prior Publication Data

US 2014/0270574 A1   Sep. 18, 2014

(30) Foreign Application Priority Data

Mar. 12, 2013  (JP) ................................. 2013-049222

(51) Int. Cl.
*G06K 9/32*  (2006.01)
*G06T 3/60*  (2006.01)
*G06T 1/60*  (2006.01)

(52) U.S. Cl.
CPC .. *G06T 3/606* (2013.01); *G06T 1/60* (2013.01)

(58) Field of Classification Search
CPC . G06K 9/3206; G06K 9/3286; G06K 9/3208; G06T 3/606; G06T 3/602; G06F 15/80; G06F 17/30257; G06F 17/3024; G06F 17/30243; G06F 17/30249; G06F 17/30274
See application file for complete search history.

(56) References Cited

U.S. PATENT DOCUMENTS

| | | | |
|---|---|---|---|
| 4,627,020 A | | 12/1986 | Anderson et al. |
| 5,537,487 A | * | 7/1996 | Miyajima et al. ............. 382/144 |
| 5,774,133 A | * | 6/1998 | Neave et al. .................. 345/505 |
| 6,026,184 A | * | 2/2000 | Fukushima ................... 382/199 |
| 8,009,174 B2 | * | 8/2011 | Beric et al. .................... 345/531 |
| 2014/0118586 A1 | * | 5/2014 | Tanaka et al. ................. 348/278 |
| 2014/0218272 A1 | * | 8/2014 | Kikuchi et al. ................. 345/77 |
| 2014/0270574 A1 | * | 9/2014 | Asukai et al. ................. 382/296 |

FOREIGN PATENT DOCUMENTS

JP    60-146367    8/1985

* cited by examiner

*Primary Examiner* — Amir Alavi
(74) *Attorney, Agent, or Firm* — Christie, Parker & Hale, LLP

(57) ABSTRACT

An image data processing including a storage unit for storing a first pixel block and a second pixel block taken from image data in which pixels are arranged in a first direction and a second direction, and a writing module for writing the first pixel block and the second pixel block stored in the storage unit into a memory, wherein the first pixel block and the second pixel block are arranged one adjacent to the other along the first direction, and the number of pixels arranged in the first direction in each block is equal to an access unit data length of the memory multiplied by a natural number m1, and the writing module writes pixel data equal in length to the access unit data length, and representing pixels contiguously arranged along the first direction across the first and second pixel blocks, into the memory in a single access operation.

8 Claims, 20 Drawing Sheets

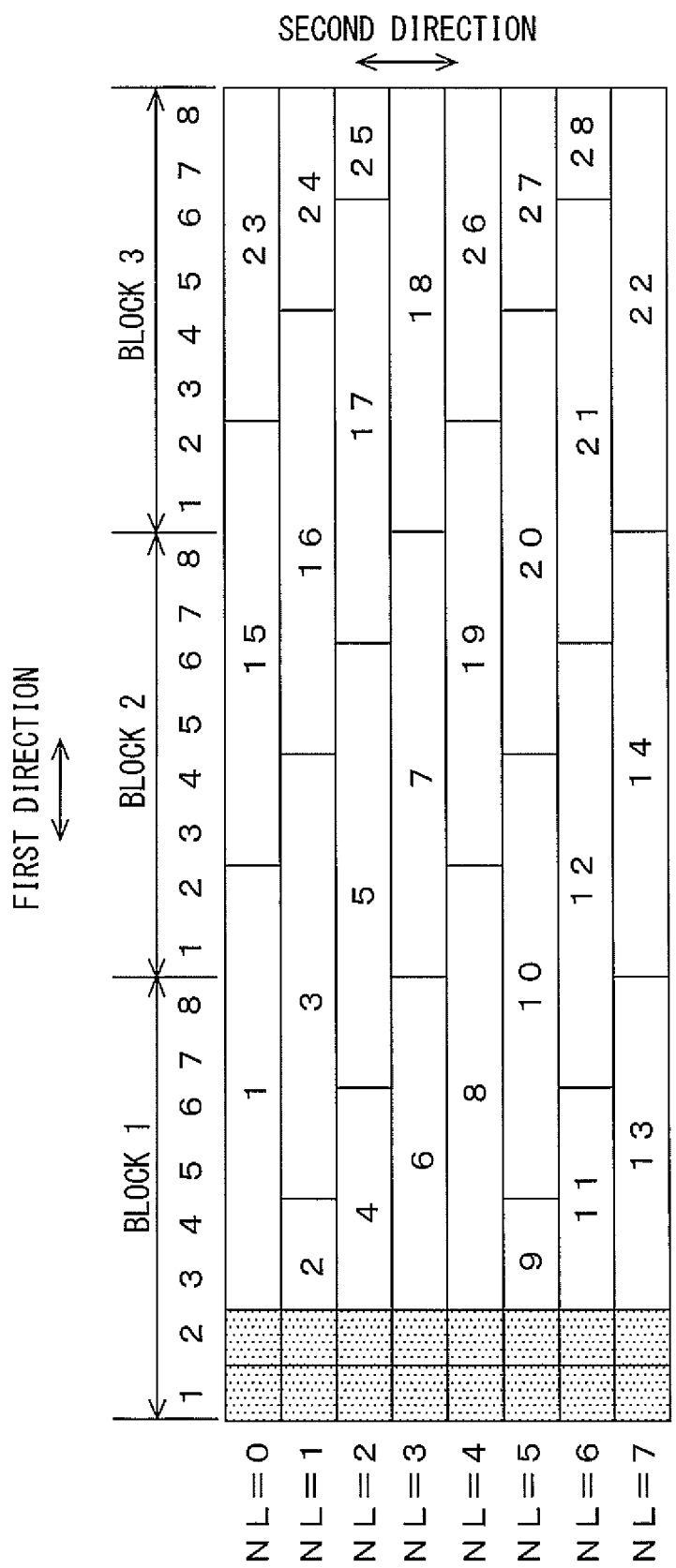

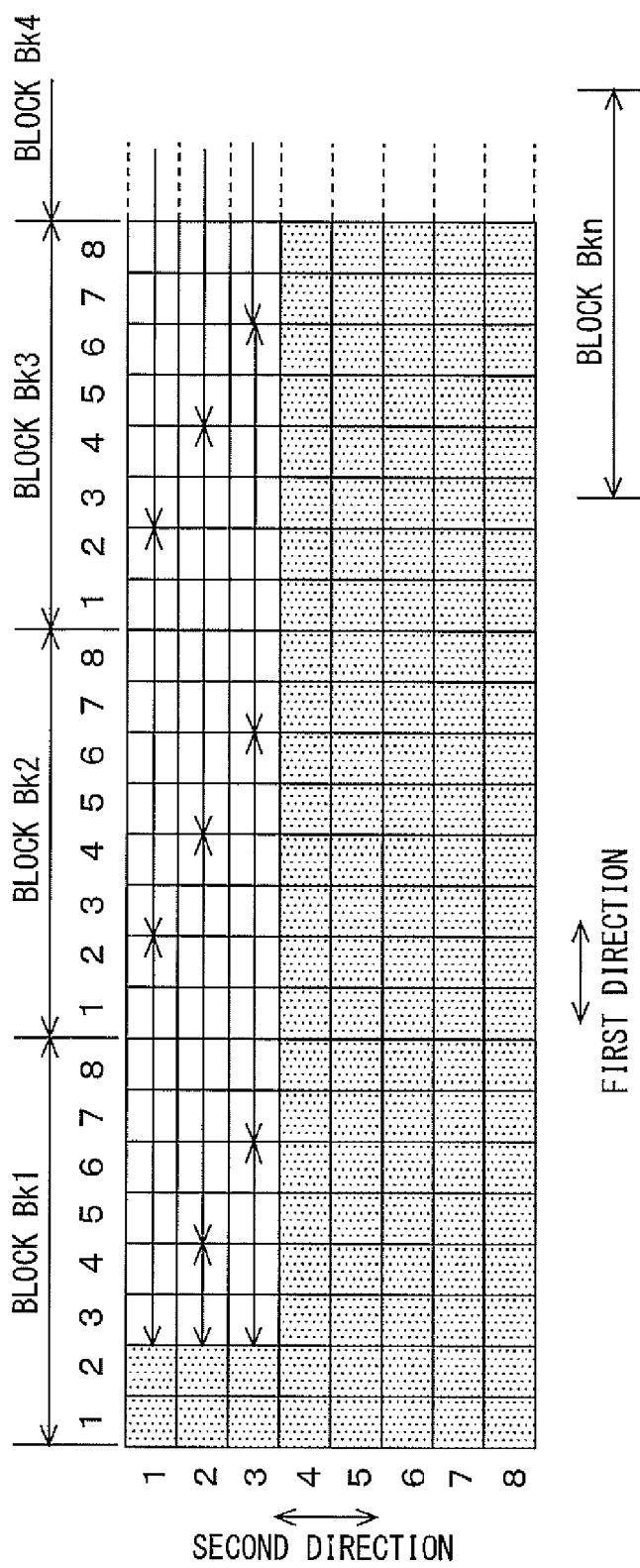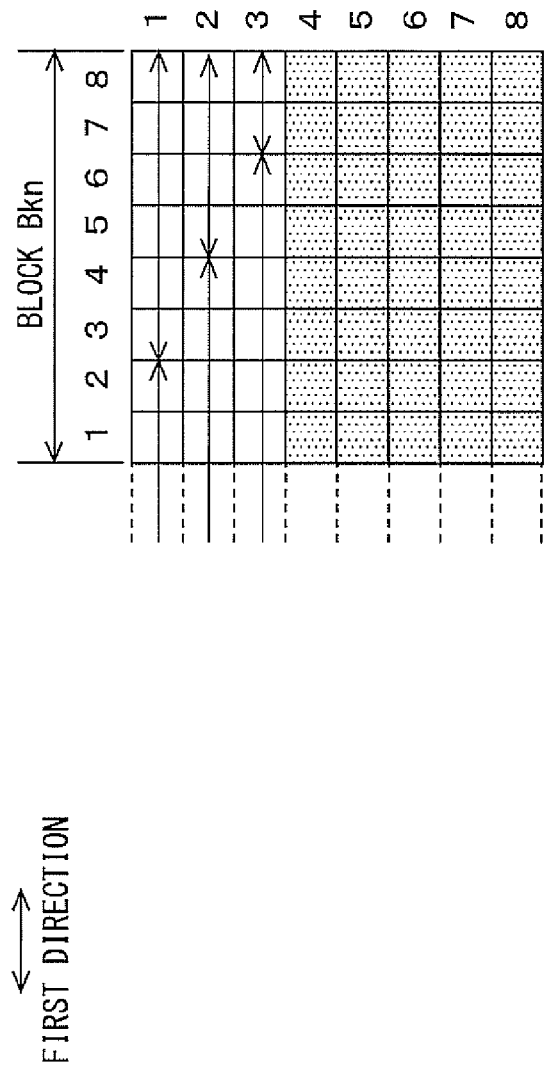
FIG. 16

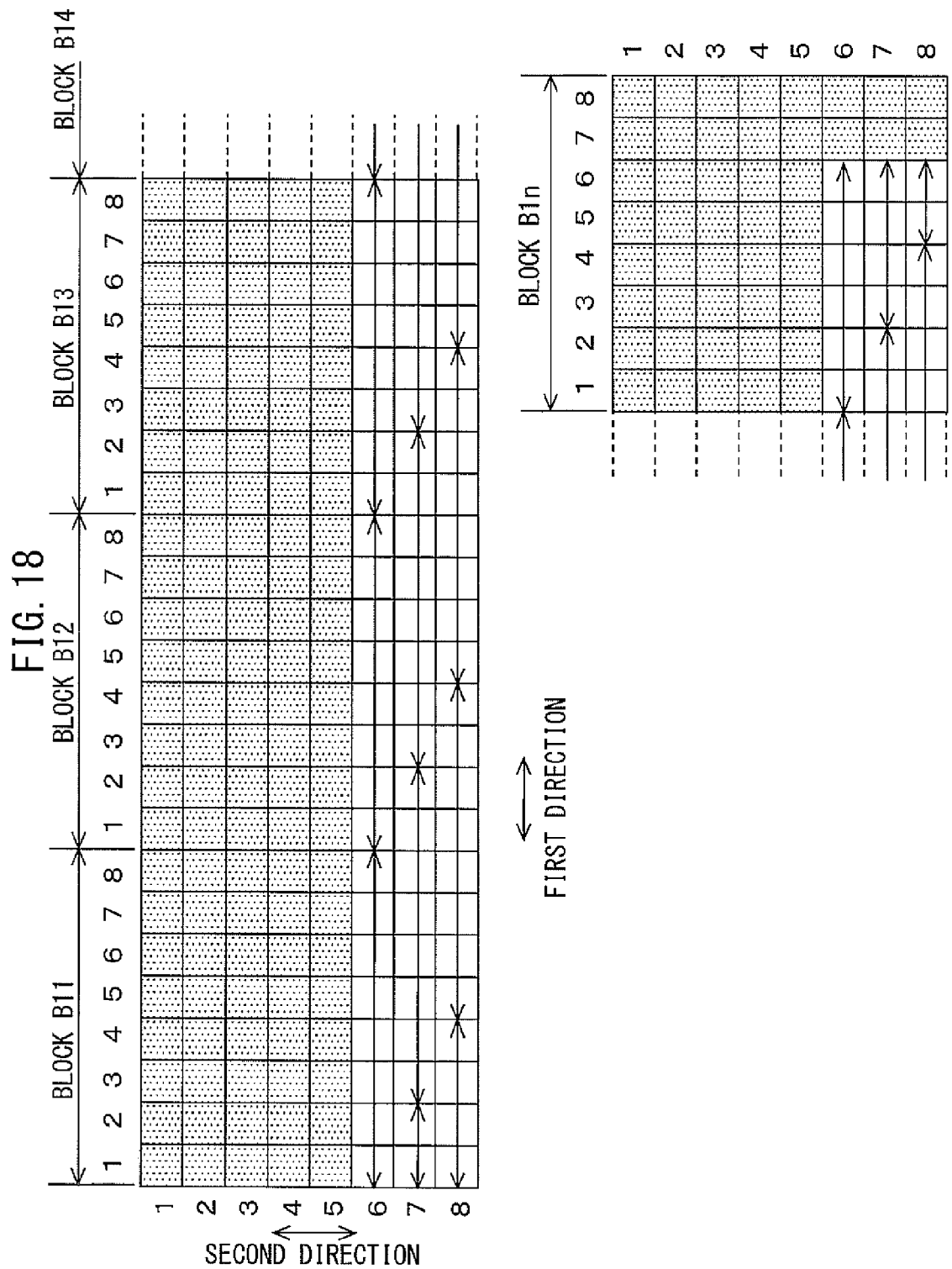

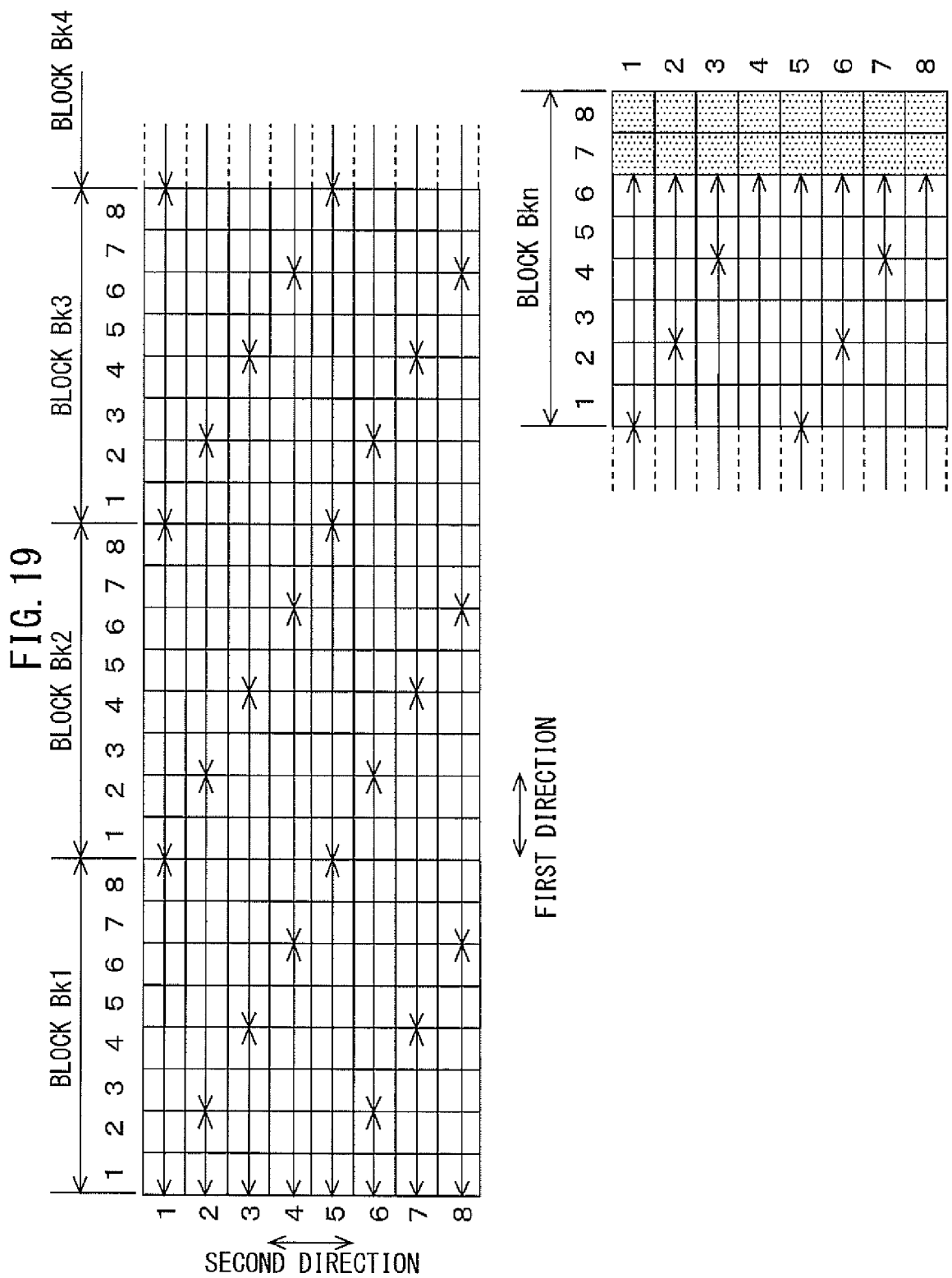

IMAGE DATA PROCESSING APPARATUS AND METHOD FOR WRITING AN IMAGE DATA INTO A MEMORY

CROSS-REFERENCE TO RELATED APPLICATIONS

This application is based upon and claims the benefit of priority of prior Japanese Patent Application No. 2013-049222, filed on Mar. 12, 2013, the entire contents of which are incorporated herein by reference.

TECHNICAL FIELD

Embodiments discussed in the present specification relate to image data processing technology.

BACKGROUND

Extracting pixel blocks from image data is known, each block representing a portion of the image data, and to apply prescribed image processing to the image data on a pixel-block by pixel-block basis. FIG. 1 is a diagram for explaining image processing to be applied to image data 100 in raster format. The image data 100 is made up of pixels arranged in the main direction and sub direction, and contains a plurality of pixel data elements, one for each pixel, to represent an image as an array of pixels.

The direction along which the pixels corresponding to the contiguous pixel data elements contained in the image data in raster format are arranged is designated as the "main direction," and the direction orthogonal to the main direction as the "sub direction". A pixel block 101 is one of the pixel blocks extracted from the image data 100, each block representing a portion of the image data, and image processing is applied to each such pixel block 101.

In the related art, it is known to provide a method for rotating an image. According to this method, an image is stored in raster format as a sequence of a plurality of bytes each having n bits, and a plurality of bytes are written into a temporary storage and separated into groups of rotatable size. The method then determines for each group whether all bits are of the same value, rotates each group in which all bits are not of the same value, and writes each rotated group in raster format into an output image storage area (for example, refer to Japanese Laid-open Patent Publication No. 60-146367).

SUMMARY

When accessing a memory to read or write image data, it is preferable to access the memory in units that match the access unit data length of the memory, that is, in burst length units, because the time required for data transfer can then be reduced. Accordingly, when reading and writing image data on a memory on a pixel-block by pixel-block basis as described above, the time required for data transfer can be reduced if the size of each pixel block is adjusted so as to match the burst length.

For example, in FIG. 1, if the number of pixels arranged along the main direction in the pixel block 101 is made equal to an integral multiple of the number of bytes of the burst length, the memory can be accessed in burst length units for all pixels in the pixel block, regardless of the number of bits used to represent one pixel. In this specification, the "number of bytes of the burst length" will be referred to simply as the "burst length".

However, in the case where a portion of the pixel block 101 is not read out of the memory or not written to the memory, the number of pixels read out of the memory or written to the memory does not become equal to an integral multiple of the burst length.

For example, consider the case where the region hatched by a sandy pattern in the pixel block 101 in FIG. 1 is not written to the memory. The region 110 in the pixel block 101 is the region not written to the memory, and the remaining region 111 is the region written to the memory.

In this case, since the number of pixels arranged along the main direction and written to contiguous areas in the memory does not become equal to an integral multiple of the burst length, the number of burst transfers of data whose byte count is less than the burst length increases, depending on the number of bits used to represent one pixel. This increases the number of memory accesses, and thus increases the time required for writing.

Accordingly, it is an object of the present invention to provide an image data processing apparatus, an image data processing method that can increase the chance of burst transferring data in burst lengths when writing image data into memory, and a computer-readable, non-transitory medium storing a computer program for causing a computer to implement such an image data processing method.

According to an aspect of the apparatus, there is provided an image data processing apparatus. The image data processing apparatus includes a storage unit for storing a first pixel block and a second pixel block taken from image data in which pixels are arranged in a first direction and a second direction which is different from the first direction, and a writing module for writing the first pixel block and the second pixel block stored in the storage unit into a memory, wherein the first pixel block and the second pixel block are arranged one adjacent to the other along the first direction, and the number of pixels arranged in the first direction in each block is equal to an access unit data length of the memory multiplied by a natural number m1, and the writing module writes pixel data equal in length to the access unit data length, and representing pixels contiguously arranged along the first direction across the first and second pixel blocks, into the memory in a single access operation.

According to an aspect of the method, there is provided an image data processing method. The image data processing method includes storing in a storage unit a first pixel block and a second pixel block taken from image data in which pixels are arranged in a first direction and a second direction which is different from the first direction, and writing, by a computer, the first pixel block and the second pixel block stored in the storage unit into a memory, wherein the first pixel block and the second pixel block are arranged one adjacent to the other along the first direction, and the number of pixels arranged in the first direction in each block is equal to an access unit data length of the memory multiplied by a natural number m1, and pixel data equal in length to the access unit data length, and representing pixels contiguously arranged along the first direction across the first and second pixel blocks, are written into the memory in a single access operation.

According to an aspect of the computer-readable, non-transitory medium storing a computer program, the computer program causes a computer to execute a process, including storing in a storage unit a first pixel block and a second pixel block taken from image data in which pixels are arranged in a first direction and a second direction which is different from the first direction, and writing the first pixel block and the second pixel block stored in the storage unit into a memory, wherein the first pixel block and the second pixel block are arranged one adjacent to the other along the first direction, and the number of pixels arranged in the first direction in each block is equal to an access unit data length of the memory multiplied by a natural number m1, and pixel data equal in length to the access unit data length, and representing pixels contiguously arranged along the first direction across the first and second pixel blocks, are written into the memory in a single access operation.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 10 is a diagram for explaining a first example of an address calculation method.

FIG. 16 is a diagram for explaining pixel ranges to be burst transferred in blocks Bk1 to Bkn read out in FIG. 14B.

FIG. 18 is a diagram for explaining pixel ranges to be burst transferred in blocks B11 to B1n read out in FIG. 17A.

FIG. 19 is a diagram for explaining pixel ranges to be burst transferred in blocks Bk1 to Bkn read out in FIG. 17B.

DESCRIPTION OF EMBODIMENTS

Hereinafter, an image data processing apparatus, image data processing method, and computer program according to an embodiment, will be described with reference to the drawings. However, the technical scope of the invention is not limited to these embodiments and extends to the inventions described in the claims and their equivalents.

1. Hardware Configuration

Figure 1:
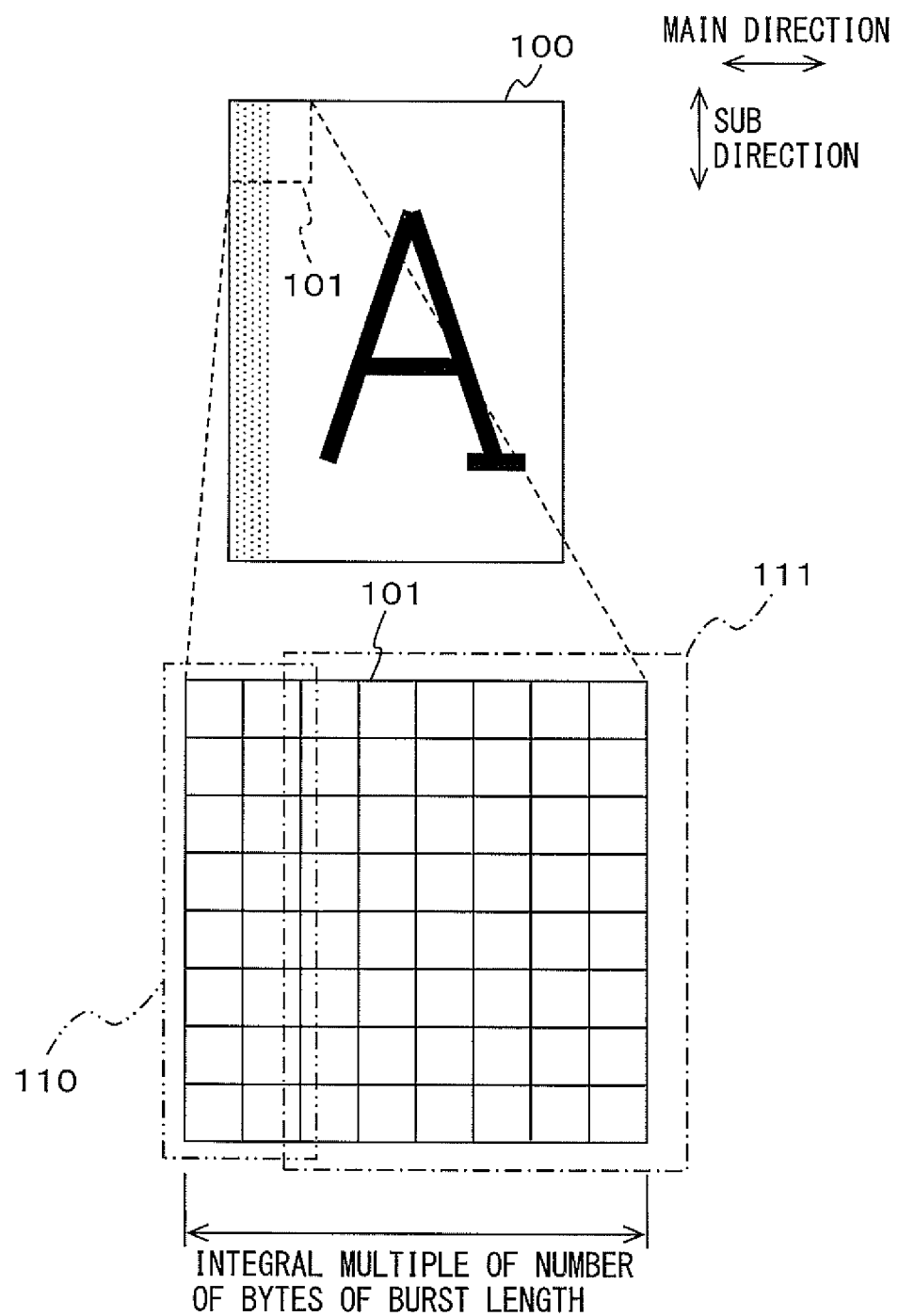
FIG. 1 is a diagram for explaining image processing to be applied to image data in raster format.
Figure 2:
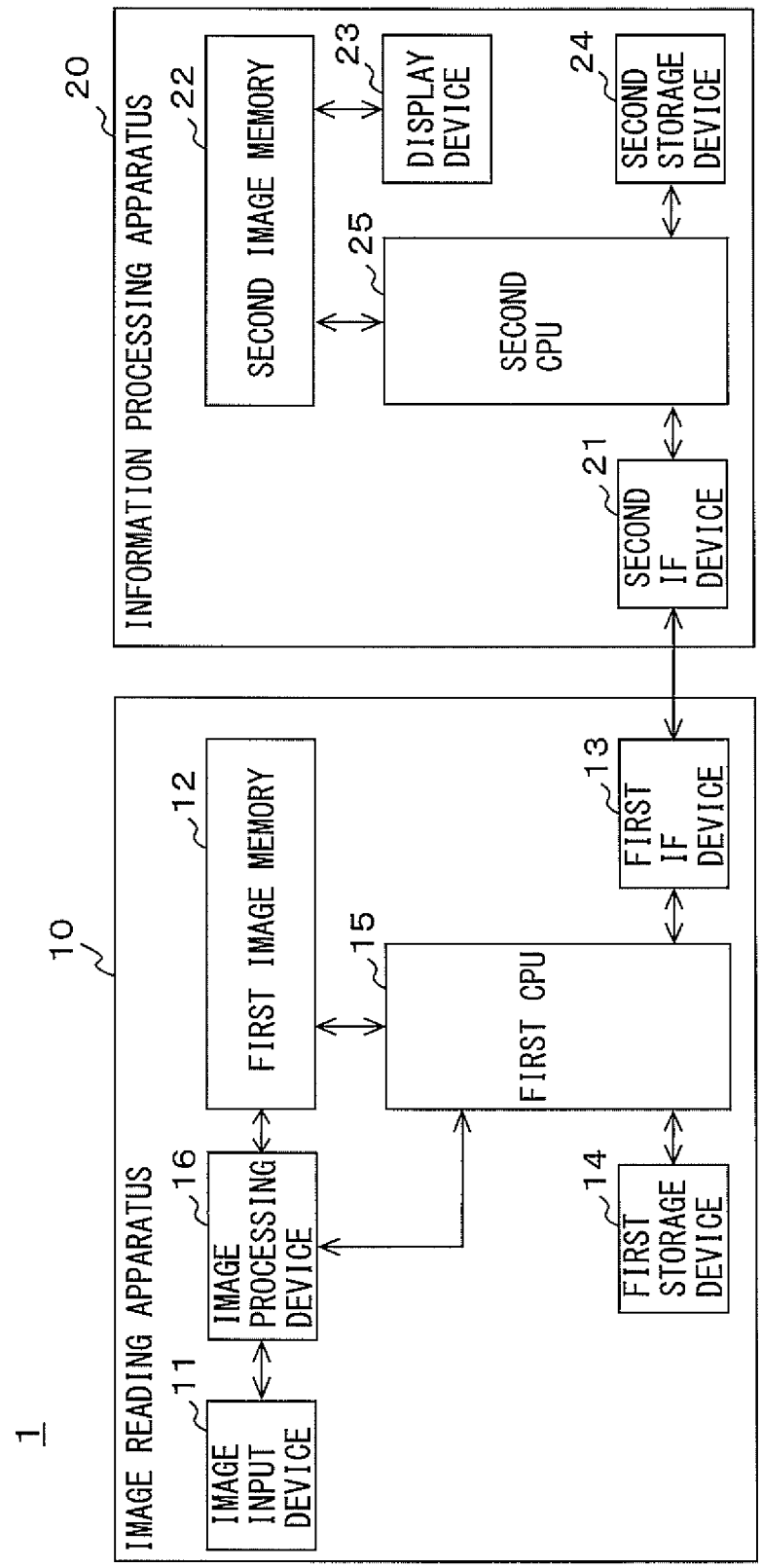
FIG. 2 is a diagram for explaining one example of the hardware configuration of an image processing system.

FIG. 2 is a diagram for explaining one example of the hardware configuration of an image processing system. As shown in FIG. 2, the image processing system 1 includes an image reading apparatus 10 and an information processing apparatus 20. The image reading apparatus 10 is, for example, an image scanner, a digital camera, or the like, and the information processing apparatus 20 is, for example, a personal computer or the like which is connected to the image reading apparatus 10 for use.

The image reading apparatus 10 includes an image input device 11, a first image memory 12, a first interface device 13, a first storage device 14, a first CPU 15, and an image processing device 16. In the figure, the interface is designated "IF". The component elements of the image reading apparatus 10 will be described in detail below.

The image input device 11 includes an image sensor for capturing an image of a subject such as a document, a scene, a person, or the like. The following description will be given by assuming that the subject whose image is to be captured is a document. The image sensor includes imaging devices, such as CCD or CMOS devices, arranged in a one-dimensional or two-dimensional array, and optics for focusing the image of the subject onto the imaging devices. Each imaging device outputs an analog value corresponding to a corresponding one of the RGB colors. The image input device 11 generates pixel data by converting each of the analog values output from the image sensor into a digital value, and generates image data (hereinafter referred to as the RGB image) constructed from the pixel data. The RGB image provides color image data represented by a total of 24 bits of RGB values with each pixel data represented by 8 bits for each RGB color.

The image input device 11 then supplies the RGB value of each pixel in the RGB image to the image processing device 16.

The image processing device 16 applies prescribed correction processing such as shading correction to the input image data, and stores the thus processed input image data in the first image memory 12. The first image memory 12 includes a storage device such as a nonvolatile semiconductor memory, a volatile semiconductor memory, a magnetic disk, or the like. The first image memory 12 is connected to the image processing device 16 and stores various kinds of processed image data that the image processing device 16 produced by applying various image processing operations to the image data.

The image processing device 16 reads out the input image data stored in the first image memory 12, and applies prescribed image processing such as processing for detecting document edges, processing for correcting the input image data, processing for converting the RGB value of each pixel into a luminance value and a color difference value (YUV value), and processing for rotating the image. The image processing device 16 is connected to the first CPU 15 and operates under the control of the first CPU 15 in accordance with a program prestored in the first storage device 14. The image processing device 16 may be constructed from an independent integrated circuit, microprocessor, firmware, or the like.

The YUV values can be calculated, for example, from the following equations.

$$Y \text{ value} = 0.30 \times R \text{ value} + 0.59 \times G \text{ value} + 0.11 \times B \text{ value} \tag{1}$$

$$U \text{ value} = -0.17 \times R \text{ value} - 0.33 \times G \text{ value } 0.50 \times B \text{ value} \tag{2}$$

$$V \text{ value} = 0.50 \times \text{value} - 0.42 \times G \text{ value} - 0.08 \times B \text{ value} \tag{3}$$

The first interface device 13 includes an interface circuit conforming, for example, to USB or other serial bus architecture, and is electrically connected to the information processing apparatus 20 for transmission and reception of image data and various kinds of information. Further, a flash memory or the like may be connected to the first interface device 13 so that the image data stored in the first image memory 12 may be transferred to the flash memory for storage.

The first storage device 14 includes a memory device such as a RAM (Random Access Memory) or ROM (Read Only Memory), a fixed disk device such as a hard disk, or a removable storage device such as a flexible disk or an optical disk. The first storage device 14 stores a computer program, data base, table, etc., which are used in the image reading apparatus 10 for various kinds of processing. The computer program may be stored on a computer-readable removable storage medium such as a CD-ROM (Compact Disc Read Only Memory) or a DVD-ROM (Digital Versatile Disc Read Only Memory). The computer program may be loaded into the first storage device 14 from such a computer-readable removable storage medium and installed by using a known setup program or the like.

The first CPU 15 is connected to the first image memory 12, the first interface device 13, the first storage device 14, and the image processing device 16, and controls them. The first CPU 15 performs control operations such as the control of the input image generation by the image input device 11, the control of the first image memory 12, the control of data transmission and reception to and from the information processing apparatus 20 via the first interface device 13, and the control of the first storage device 14. The first CPU 15 also controls the image processing that the image processing device 16 performs.

The information processing apparatus 20 includes a second interface device 21, a second image memory 22, a display device 23, a second storage device 24, and a second CPU 25. The component elements of the information processing apparatus 20 will be described in detail below.

The second interface device 21 includes an interface circuit similar to the one constituting the first interface device 13 in the image reading apparatus 10, and connects the information processing apparatus 20 to the image reading apparatus 10.

The second image memory 22 includes a storage device similar to the one constituting the first image memory 12 in the image reading apparatus 10. The second image memory 22 stores the image data and various kinds of information received from the image reading apparatus 10 via the second interface device 21.

The display device 23 includes a display, such as a liquid crystal display or an organic EL display, and an interface circuit which outputs image data to the display, and the display device 23 displays the image data retrieved from the second image memory 22.

The second storage device 24, similarly to the first storage device 14 in the image reading apparatus 10, is constructed from a memory device, a fixed disk device, a removable storage device, or the like. The second storage device 24 stores a computer program, data base, table, etc., which are used in the information processing apparatus 20 for various kinds of processing. The computer program may be loaded into the second storage device 24, for example, from a computer-readable removable storage medium such as a CD-ROM or a DVD-ROM, and installed by using a known setup program or the like.

The second CPU 25 is connected to the second interface device 21, the second image memory 22, the display device 23, and the second storage device 24, and controls them. The second CPU 25 performs control operations such as the control of data transmission and reception to and from the image reading apparatus 10 via the second interface device 21, the control of the second image memory 22, the display control for the display device 23, and the control of the second storage device 24.

The hardware configuration shown in FIG. 2 is only one example presented to explain one specific embodiment. It is to be understood that any other suitable hardware configuration may be employed for the image reading apparatus 10 and the information processing apparatus 20 described in this specification, as long as the hardware is configured to implement the above operation.

2. Functional Configuration

Figure 3:
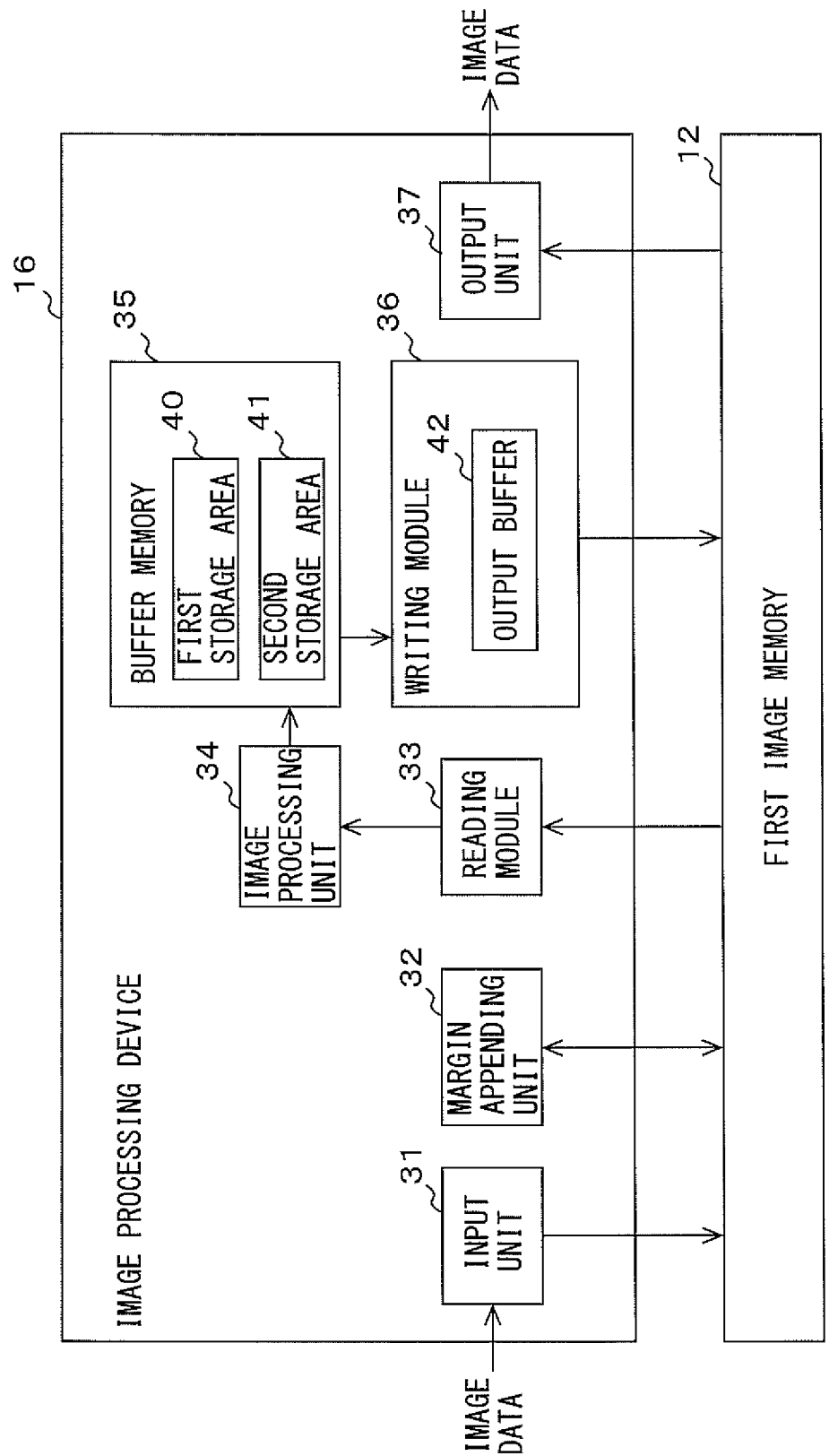
FIG. 3 is a functional block diagram of one example of an image processing device.

FIG. 3 is a functional block diagram of one example of the image processing device 16. The image processing device 16 includes an input unit 31, a margin appending unit 32, a reading module 33, an image processing unit 34, a buffer memory 35, a writing module 36, and an output unit 37.

The input unit 31 receives the image data that the image input device 11 generated by capturing an image of the subject (document). The input unit 31 applies preprocessing to the image data. In the preprocessing, the input unit 31, for example, corrects the image lightness by applying shading correction and thereby corrects density unevenness in the image data. Further, in the preprocessing, the input device 31, for example, detects a document boundary line in the image data based on the variation of pixel lightness in the document data, and corrects any skew in the image data based on the orientation of the boundary line. The input unit 31 stores the preprocessed image data in the first image memory 12.

Figure 4A:
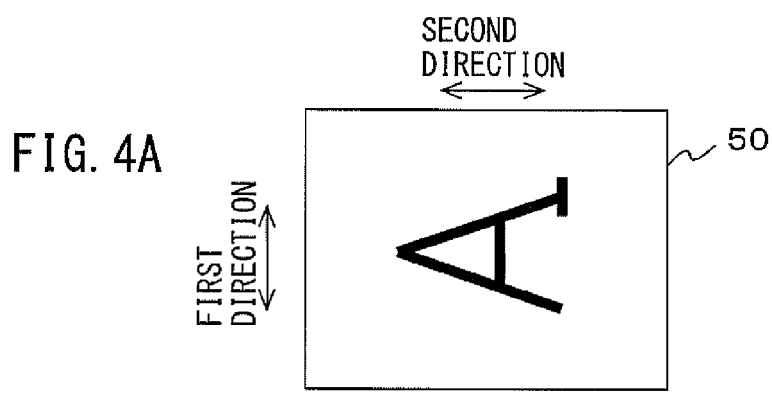
FIG. 4A is a schematic diagram illustrating image data being processed by the image processing device.

FIG. 4A is a diagram showing one example of the preprocessed image data 50 stored in the first image memory 12. The image data 50 is image data in raster format, and contains pixel data representing pixels arranged in first and second directions, respectively. In this specification, the term "first direction" refers to the direction in which the pixels are arranged along the main direction after the image processing to be described later is applied by the image processing unit 34. The term "second direction" refers to the direction orthogonal to the first direction.

When the image processing by the image processing unit 34 does not require image rotation or 180-degree rotation, the first direction and the second direction are the same as the main direction and the sub direction, respectively, of the image data 50 that the input unit 31 stored in the first image memory 12. On the other hand, when the image processing by the image processing unit 34 involves 90-degree rotation, the first direction and the second direction are the same as the sub direction and the main direction, respectively, of the image data 50 that the input unit 31 stored in the first image memory 12.

The image data 50 in FIG. 4A that the input unit 31 stored in the first image memory 12 is rotated to the left by 90 degrees relative to the original document. In this case, since the image processing by the image processing unit 34 involves 90-degree right rotation, the sub direction and the main direction of the image data 50 are the first direction and the second direction, respectively.

The margin appending unit 32 reads the image data 50 from the first image memory 12, and generates margined image data 60 by appending margin data 61 to the image data 50 in accordance with the burst length of the first image memory 12. The margin appending unit 32 stores the margined image data 60 in the first image memory 12. While the margin appending unit 32 is shown here as being an independent functional block for illustrative purposes, a function equivalent to that of the margin appending unit 32 may be incorporated into the input unit or an image processing block not shown here.

The margin appending unit 32, for example, adjusts the number of pixels in the first direction of the margin data 61 so that the number of pixels in the first direction of the margined image data 60 becomes equal to the burst length of the first image memory 12 multiplied by (m1×n). It also adjusts the number of pixels in the second direction of the margin data 61 so that the number of pixels in the second direction of the margined image data 60 becomes equal to the burst length multiplied by (m2×k). The constants m1 and m2 and the variables n and k are natural numbers.

Figure 4B:
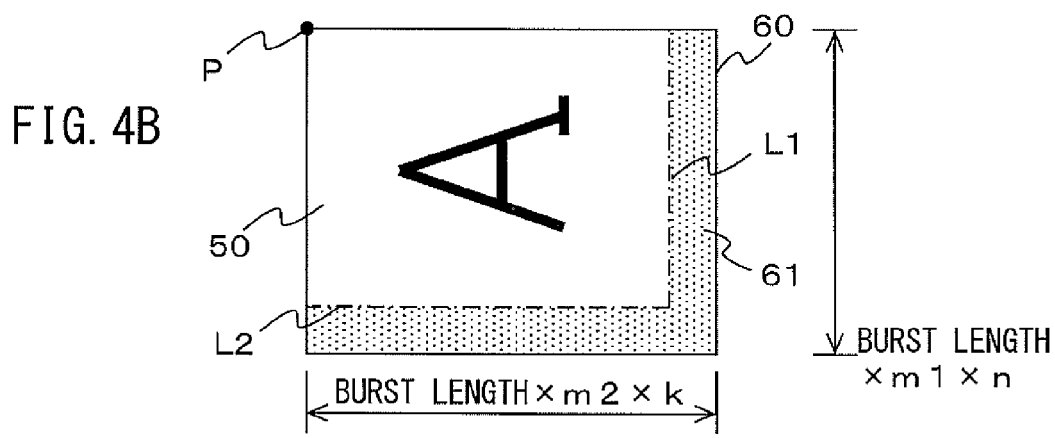
FIG. 4B is a schematic diagram illustrating image data being processed by the image processing device.

FIG. 4B is a diagram showing one example of the margined image data 60. For example, of the sides extending along the first direction of the image data 50, the margin appending unit 32 may add the margin data 61 to the side L1 located farther away from the starting pixel P of the image data 50. Further, of the sides extending along the second direction, the margin appending unit 32 may add the margin data 61 to the side L2 located farther away from the starting pixel P.

Figure 4C:
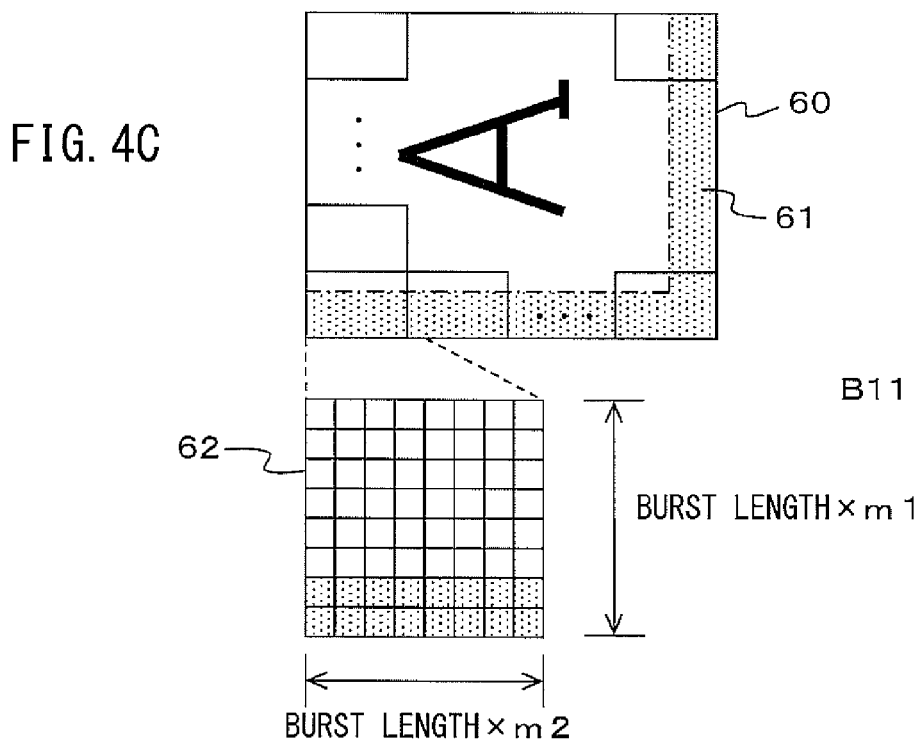
FIG. 4C is a schematic diagram illustrating image data being processed by the image processing device.

The reading module 33 reads out the margined image data 60 from the first image memory 12 by dividing the margined image data 60 into pixel blocks 62 each representing a portion thereof. FIG. 4(C) is a diagram showing one example of the pixel block 62. In the following description and the accompanying drawings, the pixel block will be referred to simply as the "block".

The number of pixels in the first direction of the block 62 is equal to the burst length of the first image memory 12 multiplied by m1. The number of pixels in the second direction of the block 62 is equal to the burst length multiplied by m2. The number of pixels in the first direction of the block 62 and number of pixels in the second direction of the block 62 may be the same or may be different. The values of m1 and m2 may be the same or may be different.

In this specification, a description will be given by assuming the case where the burst length is 8 bytes and the values of m1 and m2 are both "1". Accordingly, the number of pixels in the first direction of the block 62 and the number of pixels in the second direction are both equal to "8". However, these values are only examples, and the burst length and the constants m1 and m2 may take other values. For example, the burst length may be 32 bytes. Further, this specification deals with the case where the number of bits representing one pixel is 8, i.e., one byte. However, this value is only an example, and the number of bits representing one pixel may be other than 8 bits.

The number of pixels in the second direction, i.e., the main direction, of the margined image data 60 is equal to the burst length multiplied by (m2×k). That is, the number of pixels in the second direction of the block 62 is equal to the burst length multiplied by a natural number, which means that the number of pixels in the second direction of the margined image data 60 is divisible by the number of pixels in the second direction of the block 62. This prevents the block 62 from being burst transferred by being divided into data whose byte count is less than the burst length when reading out the block 62.

The image processing unit 34 applies prescribed image processing to each block 62 read out by the reading module 33. The prescribed processing may include, for example, 90-degree right rotation, 90-degree left rotation, 180-degree rotation, reversion, noise elimination, etc. For example, the image processing applied to the image data 50 of FIG. 4A may be 90-degree right rotation.

Figure 5:
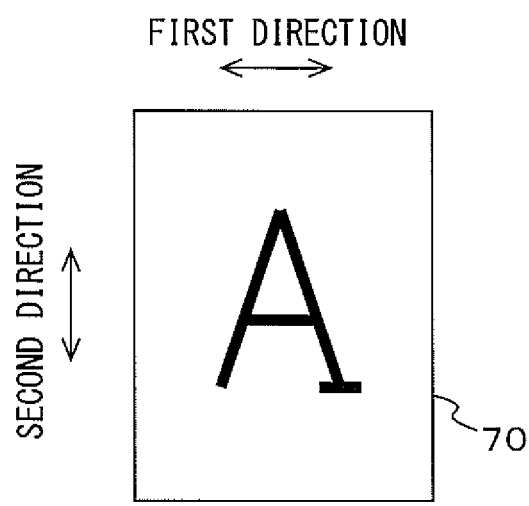
FIG. 5 is a diagram showing one example of the processed image data.

The image processing unit 34 stores the thus processed block 62 in the buffer memory 35. The buffer memory 35 includes a first storage area 40 and a second storage area 41 each for storing a different block 62. The writing module 36 reads out the blocks 62 stored in the buffer memory 35 and writes them into the first image memory 12. FIG. 5 is a diagram showing one example of the processed image data 70 written into the first image memory 12 by the writing module 36.

If the number of pixels in the first direction of the block 62 is different from the number of pixels in the second direction, the position within the image data 70 at which the block 62 is written is different when the image is rotated by 90 degrees by the image processing unit 34 than when it is not rotated. As a result, the method of address calculation when reading the image data from the buffer memory 35 or the method of address calculation when writing the pixel data of the image data 70 into the first image memory 12 has to be changed. On the other hand, when the number of pixels in the first direction of the block 62 is made equal to the number of pixels in the second direction, i.e., when m1 and m2 are made equal in value, there is no need to change the method of address calculation, irrespective of the presence or absence of 90-degree rotation.

The output unit 37 reads out the processed image data 70 from the first image memory 12, and supplies it, for example, to the first CPU 15.

The functional block diagram of FIG. 3 has been shown by focusing on the configuration related to the functions described in this specification. The image processing device 16 may include other component elements than those shown.

3. Description of Operation

Figure 6:
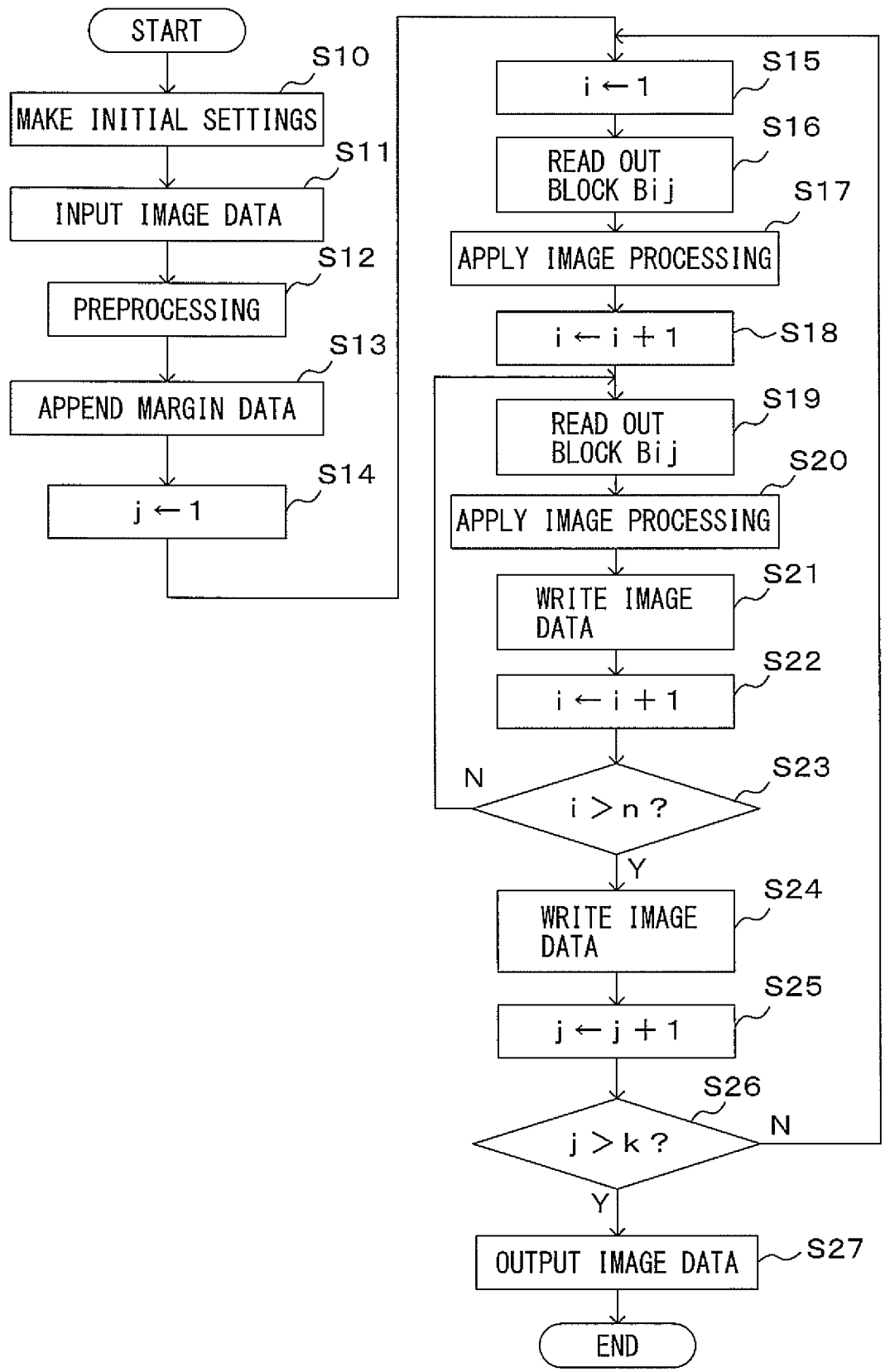
FIG. 6 is a diagram for explaining the operation of an image reading apparatus.

FIG. 6 is a diagram for explaining the operation of the image reading apparatus 10. In step S10, the first CPU 15 makes initial settings for the image processing device 16. For example, the first CPU 15 sets information, such as the presence or absence of image rotation by the image processing unit 34, the direction and angle of rotation, and pixel counts in the main and sub directions of the image data 50, into the registers provided in the image processing unit 34 to control the operation of the image processing unit 34.

In step S11, the input unit 31 receives the image data 50 from the image input device 11. In step S12, the input unit 31 applies preprocessing to the image data. The input unit 31 stores the preprocessed image data in the first image memory 12.

In step S13, the margin appending unit 32 reads the image data 50 from the first image memory 12, and creates the margined image data 60 by appending the margin data 61 to the image data 50. The margin appending unit 32 stores the margined image data 60 in the first image memory 12.

Figure 7:
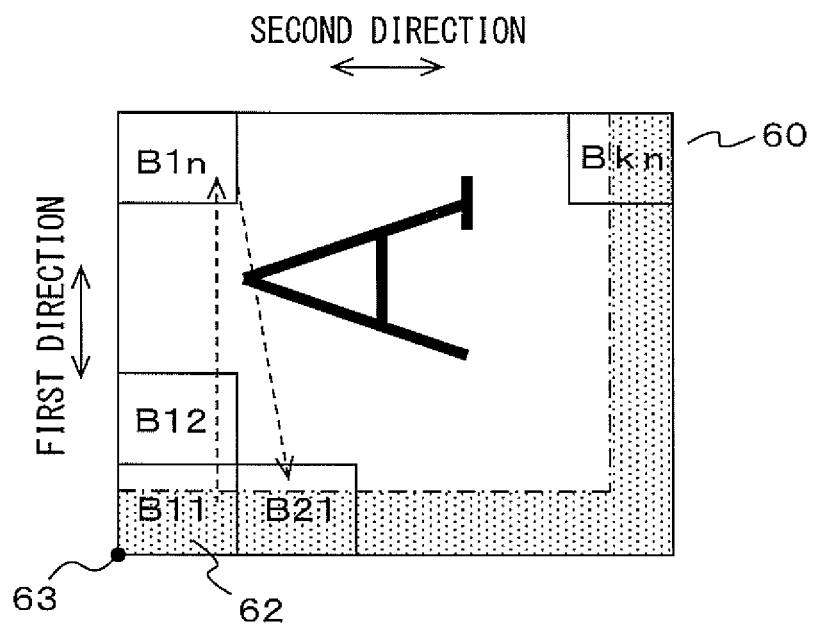
FIG. 7 is a diagram for explaining the relationship between each pixel block and variables i and j.

In steps S14 and S15, the reading module 33 specifies the first block to be read out. For convenience, in the description of this specification, variables i and j are used to specify each individual block 62. FIG. 7 is a diagram for explaining the relationship between each block 62 and the variables i and j.

The variable i is used to specify the column number of the block 62 as defined along the second direction, and the variable j to specify the row number of the block 62 as defined along the first direction. The block containing the pixel data 63 corresponding to the starting pixel of the image data 70 processed by the image processing unit 34 is defined as the block in the first column and the first row. In the following description, the block in the ith column and the jth row will be referred to as the block Bij. The block Bij may sometimes be collectively referred to as the "block 62".

The above block specification method is only an example. The reading module 33 may specify each individual block by some other suitable method. In the above example, the reading module 33 in steps S14 and S15 sets the variables j and i both to "1" in order to read out the block B11 first.

Figure 8A:
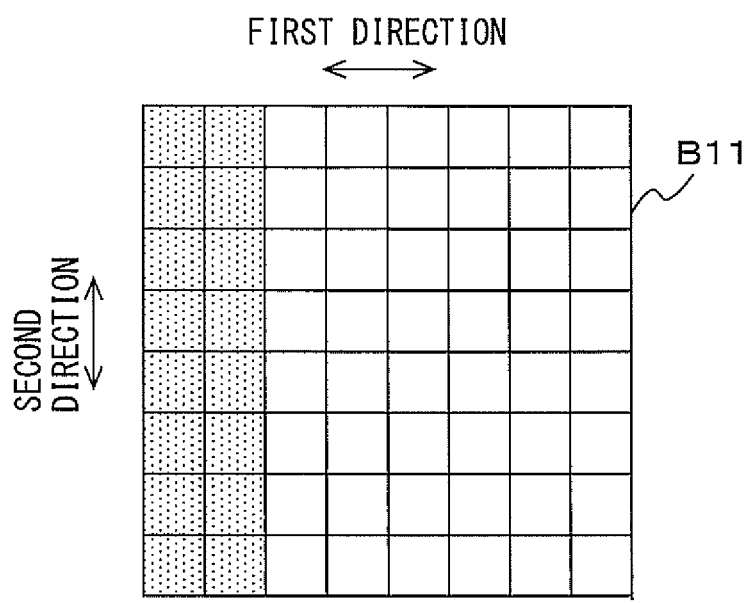
FIG. 8A is a diagram for explaining pixel blocks stored in a buffer memory.

In step S16, the reading module 33 reads out the block Bij. In step S17, the image processing unit 34 applies prescribed image processing to the block Bij read out in step S16. After applying the image processing, the image processing unit 34 stores the block Bij in the first storage area 40 within the buffer memory 35. FIG. 8A is a diagram for explaining the block B11 stored in the first storage area 40. In the illustrated example, the block B11 contains margin pixel data 61. In the accompanying drawings described hereinafter, the pixels in the margin data 61 are each shown as a hatched rectangle.

In step S18, the reading module 33 specifies the block to be read out next. In the illustrated example, the reading module 33 increments the variable i by 1. In step S19, the reading module 33 reads out the block Bij. That is, the reading module 33 sequentially reads out the blocks arranged contiguously along the first direction.

Figure 8B:
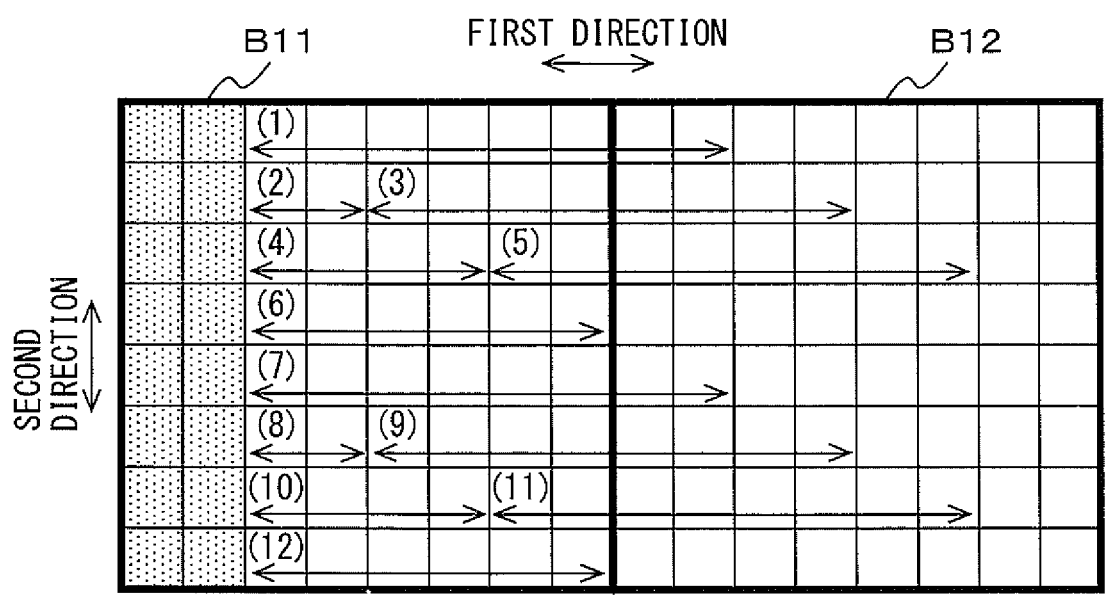
FIG. 8B is a diagram for explaining pixel blocks stored in a buffer memory.

In step S20, the image processing unit 34 applies prescribed image processing to the block Bij read out in step S19. If the preceding block Bij is stored in the first storage area 40, the image processing unit 34 stores the current block Bij in the second storage area 41. If the preceding block Bij is stored in the second storage area 41, the image processing unit 34 stores the current block Bij in the first storage area 40. That is, the two blocks 62 arranged contiguously to each other along the first direction are stored in the first and second storage areas 40 and 41, respectively. FIG. 8B is a diagram for explaining the blocks B11 and B12 stored in the first and second storage areas 40 and 41, respectively.

In step S21, the writing module 36 writes the pixel data held in the buffer memory 35 into the first image memory 12. When writing, the writing module 36 first writes the pixel data held in the buffer memory 35 to an output buffer 42 which holds data in burst lengths, and then burst transfers the pixel data out of the output buffer 42 into the first image memory 12.

In this case, the writing module 36 writes the pixel data of the block 62 to the first image memory 12 by excluding therefrom the pixel data associated with the margin data 61. Therefore, the number of pixels arranged in the first direction in the block 62 read out of the first or second storage area 40 or 41 and written into the image data 70, i.e., the number of pixels in the main direction, may not become equal to the burst length multiplied by a natural number. As a result, if the image data is burst transferred into the image data 70 on a block-by-block basis, the number of burst transfers of pixel data whose byte count is less than the burst length increases.

In view of the above, the writing module 36 concatenates the two blocks 62 stored in the first or second storage area 40 or 41, and transfers pixel data equal in length to the burst length and contiguous across the two blocks 62 in a single burst operation.

In the example of FIG. 8B, the ranges of pixel data indicated by double-headed arrows with parenthesized numbers (1) to (12) each represent the range of pixels to be transferred in a single burst operation. For example, the pixel data with the parenthesized number (1) is pixel data equal in length to the burst length and contiguous in the first row extending from the block B11 into the block B12.

As will be described below, when the writing of the block B11 to the first image memory 12 is completed, the block B13 is read into the first storage area 40, and pixel data elements contiguously arranged across the blocks B12 and B13 are burst transferred. When the writing of the block B12 is completed, the block B14 is read into the second storage area 41, and pixel data elements contiguously arranged across the blocks B13 and B14 are burst transferred. The same operation is repeated until the last block B1n in the current row is reached.

The pixel data elements corresponding to the first two pixels in the first row of the last block B1n are already burst transferred together with the six pixel data elements in the preceding block B1 (n−1). As a result, the writing module 36 transfers the pixel data corresponding to the last six pixels in the first row of the last block B1n in a single burst operation. The addresses in the first image memory 12 are divided into segments each accessed by a single burst transfer, and the transferred pixel data of the six pixels is written to the head of the segment.

Accordingly, the pixel data of the two pixels indicated by the parenthesized number (2) that follows the margin data 61 in the second row of the starting block B11 is written to the address at the end of the segment in the first image memory 12. Therefore, the writing module 36 does not transfer the pixel data in the second row of the last block B11 and its succeeding pixel data at the same time to the first image memory 12.

In the following description, the image data containing the image data shorter in length than the burst length and written to the end of the segment in the first image memory 12 may sometimes be referred to as the "first fractional data". The image data indicated by parenthesized numbers (2), (4), (6), (8), (10), and (12) are examples of the first fractional data. Further, the image data within the last block Bjn that contains the image data shorter in length than the burst length and is written to the head of the segment in the first image memory 12 may hereinafter sometimes be referred to as the "second fractional data".

In step S21, the writing module 36 writes the fractional data in the block B(i−1)j and the pixel data equal in length to the burst length and contiguous across the blocks B(i−1)j and Bij into the first image memory 12.

In step S22, the reading module 33 specifies the block to be read out next. The reading module 33 increments the variable i by 1. In step S23, the reading module 33 determines whether the value of the variable i is larger than the number, n, of columns of blocks arranged along the first direction.

If the value of the variable i is larger than the number, n, of columns (Y in step S23), the process proceeds to step S24. If the value of the variable i is not larger than the number, n, of columns (N in step S23), the process returns to step S19. In step S24, the writing module 36 in the image processing device 16 writes the second fractional data of the last block Bjn in the jth row to the first image memory 12.

In step S25, the reading module 33 specifies the block to be read out next. The reading module 33 increments the variable j by 1. In step S26, the reading module 33 determines whether the value of the variable j is larger than the number, k, of rows of blocks arranged along the second direction. If the value of the variable j is larger than the number, k, of rows (Y in step S26), the process proceeds to step S27. If the value of the variable j is not larger than the number, k, of rows (N in step S26), the process returns to step S15. In step S27, the output unit 37 reads out the processed image data 70 from the first image memory 12 and outputs the readout data.

4. Example of Address Calculation Method

Next, the method of calculating the read address used for reading pixel data from the block 62 and the write address used for writing the image data 70 to the first image memory 12 will be described for the case where the writing module 36 writes the pixel data to the first image memory 12. The number of addresses used to store the image data of the same pixel count varies depending on the number of bits used to represent one pixel. In the following, the address calculation will be described by assuming that the actual number of addresses used to store one pixel is 1.

Figure 9A:
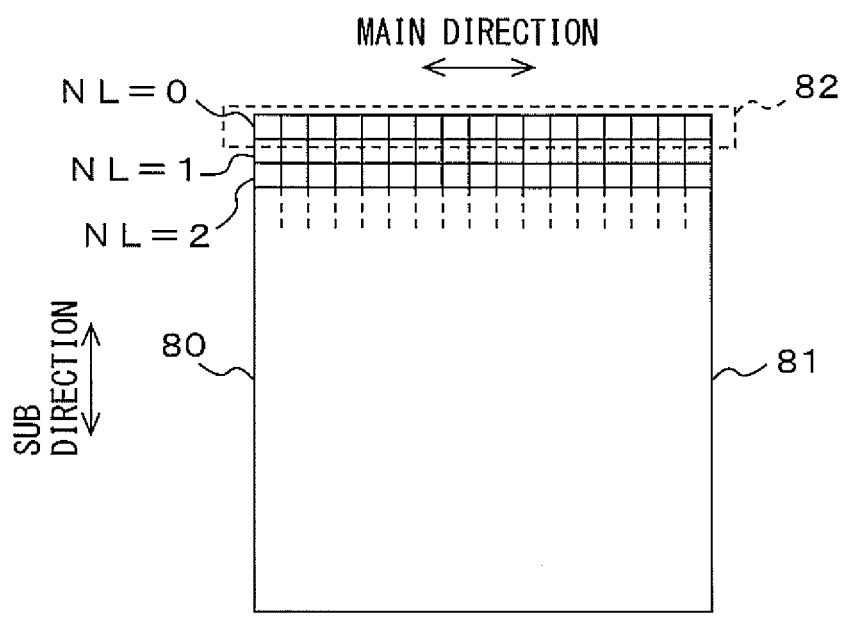
FIG. 9A is a diagram for explaining variables used for address calculation.

FIG. 9A is a diagram for explaining line numbers NL used for address calculation. In the following description, an array of pixels 82 arranged in the main direction from one end 80 of image data to the other end 81 thereof, whether it be the image data 50 in raster format, the block 62, or the image data 70, will be referred to as the "line". Of the two ends of the line, the end nearer to the starting data will be referred to as the "starting end", and the other as the "terminating end".

The line numbers NL are ordinal numbers assigned to the respective lines forming the image data 70. Line number "0" is assigned to the first line that contains the starting pixel of the image data 70, and the subsequent line numbers as ordinal numbers are assigned to the subsequent lines in sequence in order of increasing distance from the first line.

Figure 9B:
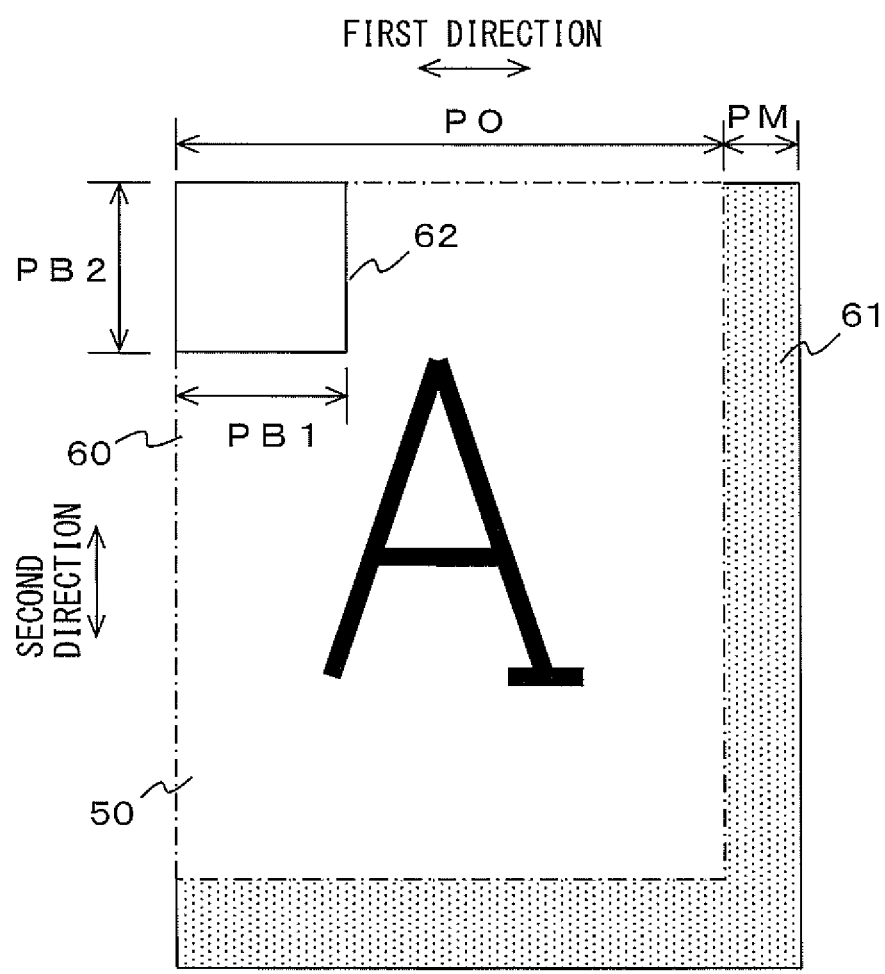
FIG. 9B is a diagram for explaining variables used for address calculation.

FIG. 9B is a diagram for explaining pixel counts PB1 and PB2 of the block 62, image width PO, and margin width PM used for address calculation. The pixel counts PB1 and PB2 represent the numbers of pixels arranged in the first and second directions, respectively, of the block 62. The image width PO represents the number of pixels arranged in the first direction of the image data 50. The margin width represents the number of pixels arranged in the first direction of the margin data 61.

FIG. 10 is a diagram for explaining a first example of the address calculation method when the margin data 61 is provided on the line starting end side of the image data 50. In the following, the address calculation method will be described by taking as an example the case where the number, n, of columns of blocks 62 is three, but essentially the same address calculation method can be applied even when the number, n, of columns is four or larger.

Rectangles designated by numbers 1 to 28 each represent the range of pixels arranged in the first direction in blocks 1 to 3 and to be transferred in a single burst operation. The set of pixels contained in each rectangle will be designated "pixel group". The pixel groups are identified by the number 1 to 28 contained in the respective rectangles, and are designated "pixel group 1", ..., "pixel group 28", respectively.

The numbers 1 to 8 appearing alongside each of the blocks 1 to 3 indicate the positions of the eight pixels arranged in the first direction in the corresponding block.

Group number NB is defined for each of the pixel groups contained in each line. The group numbers NB are ordinal numbers assigned to the respective pixel groups in each line. Group number "0" is assigned to the pixel group that contains the starting end of the line, and the subsequent group numbers as ordinal numbers are assigned to the remaining groups in sequence in order of increasing distance from the starting end of the line. For example, the "pixel group 1", "pixel group 15", and "pixel group 23" in the line designated by the line number NL=0 are assigned the group numbers 0, 1, and 2, respectively. On the other hand, the "pixel group 2", "pixel group 3", "pixel group 16", and "pixel group 24" in the line designated by the line number NL=1 are assigned the group numbers 0, 1, 2, and 3, respectively.

When the starting address at which the image data 70 is written to the first image memory 12 is denoted as AS, the write address AW at which the start of each pixel group is written to the first image memory 12 is given by the following equation (1).

When $(PM \times NL) \bmod PB1 = 0$ then $AW = AS + PO \times NL + PB1 \times NB$ When $(PM \times NL) \bmod PB1 \neq 0$ and $NB = 0$ then $AW = AS + PO \times NL$ When $(PM \times NL) \bmod PB1 \neq 0$ and $NB > 0$ then $AW = AS + PO \times NL + PB1 \times (NB-1) + ((PM \times NL) \bmod PB1)$ \hfill (1)

The operator (X mod Y) yields the remainder when an integer X is divided by an integer Y. The number of write bytes, BWS, of the pixel group at the starting end of each line is given by the following equation (2). The number of write bytes, BWE, of the pixel group at the terminating end of each line is given by the following equation (3).

$BWS = (PM \times NL) \bmod PB1$ \hfill (2)

$BWE = (PB1 - PM) - ((PM \times NL) \bmod PB1)$ \hfill (3)

Assuming that the addresses in the buffer memory 35 where each block 62 is stored are contiguous addresses, the read address AR for reading the start of each pixel group from the block 62 is given by the following equation (4).

When $(PM \times NL) \bmod PB1 = 0$ then $AR = ((NL \bmod PB2) \times PB1) + (PB1 \times PB2) \times (NB \bmod 2) + PM$ When $(PM \times NL) \bmod PB1 \neq 0$ and $NB = 0$ then $AR = ((NL \bmod PB2) \times PB1) + PM$ When $(PM \times NL) \bmod PB1 \neq 0$ and $NB > 0$ then $AR = ((NL \bmod PB2) \times PB1) + ((PM \times NL) \bmod PB1) + (PB1 \times PB2) \times ((NB-1) \bmod 2) + PM$ \hfill (4)

Figure 11:
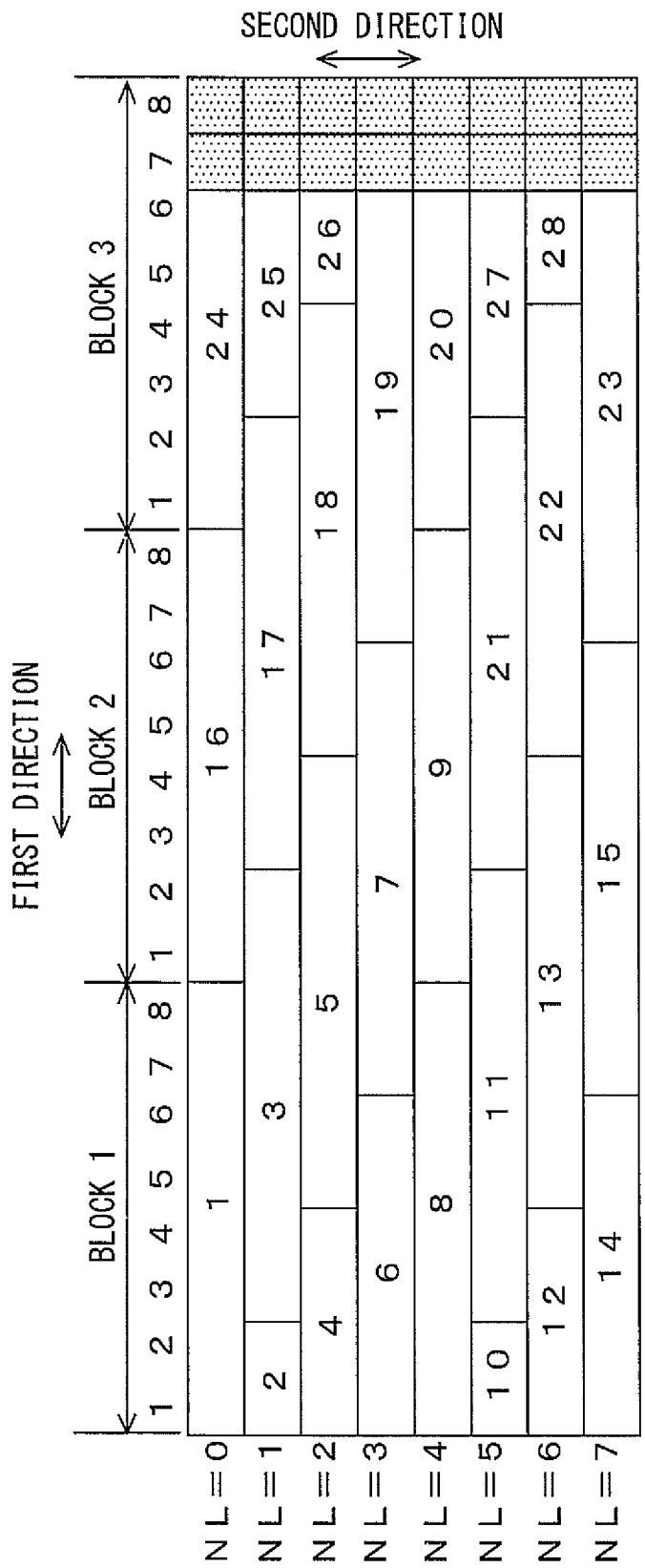
FIG. 11 is a diagram for explaining a second example of an address calculation method.

FIG. 11 is a diagram for explaining a second example of the address calculation method when the margin data 61 is provided on the line terminating end side. The write address AW at which the start of each pixel group is written to the first image memory 12, the number of write bytes, BWS, of the pixel group at the starting end, and the number of write bytes, BWE, of the pixel group at the terminating end are given by the above equations (1) to (3), respectively.

The read address AR for reading the start of each pixel group from the block 62 is given by the following equation (5).

When $(PM \times NL) \bmod PB1 = 0$ then $AR = ((NL \bmod PB2) \times PB1) + (PB1 \times PB2) \times (NB \bmod 2)$ When $(PM \times NL) \bmod PB1 \neq 0$ and $NB = 0$ then $AR = ((NL \bmod PB2) \times PB1)$ When $(PM \times NL) \bmod PB1 \neq 0$ and $NB > 0$ then $AR = ((NL \bmod PB2) \times PB1) + ((PM \times NL) \bmod PB1) + (PB1 \times PB2) \times ((NB-1) \bmod 2)$ \hfill (5)

The above process performed by the image processing device 16 may be executed by the first CPU 15. The computer program for causing the first CPU 15 to execute the above process may be stored in the first storage device 14. The computer program may be stored on a computer-readable removable storage medium such as a CD-ROM, DVD-ROM, or the like. The computer program may be loaded into the first storage device 14 from such a removable storage medium and installed by using a known setup program or the like.

5. Advantageous Effects of Embodiment

By appending the margin data 61, the number of pixels in the main direction of the block 62 to be read out of the first image memory 12 becomes equal to the burst length multiplied by a natural number, which serves to prevent the block 62 from being burst transferred by being divided into data shorter in length than the burst length. This has the effect of reducing the time required for reading the block 62 from the first image memory.

Further, by writing the block 62 to the first image memory 12 after removing the margin data 61 from it, the number of memory accesses can be reduced compared with the case in which, after once writing the block 62, the block 62 is read out again and processing is performed to remove the margin data 61. Moreover, since the data before and after removing the margin data need not be stored in the first image memory 12 in duplicate manner, the amount of memory used can be reduced.

Furthermore, since a plurality of blocks 62 are concatenated, and the pixel data equal in length to the burst length and contiguous across these blocks 62 are transferred to the first image memory 12 in a single burst operation, the chance of burst transferring data in burst lengths increases. This effect will be described below.

Figure 12A:
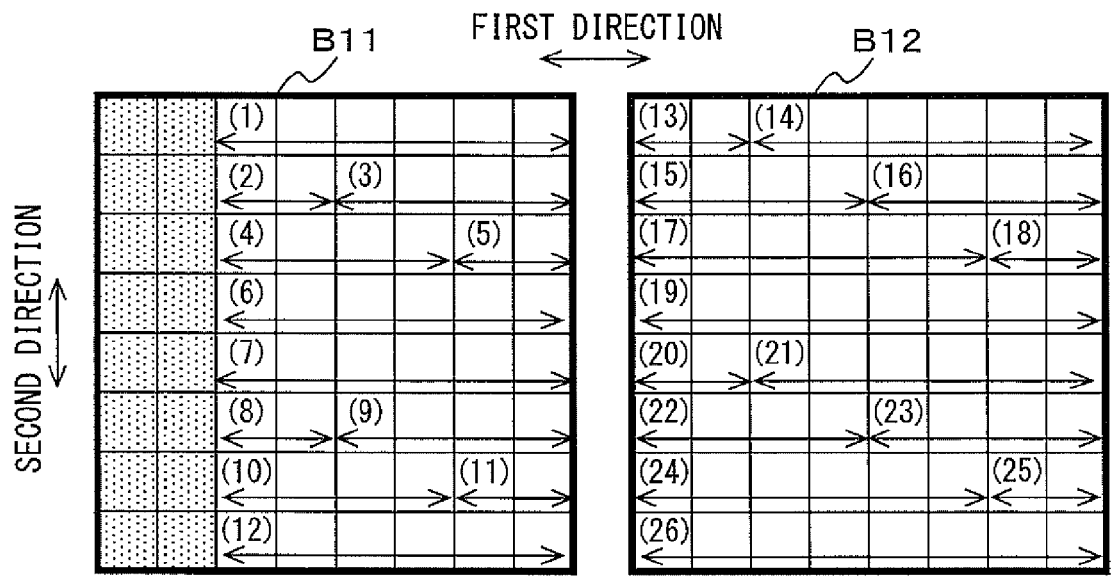
FIG. 12A is a diagram for explaining memory accesses when image blocks are not concatenated.
Figure 12B:
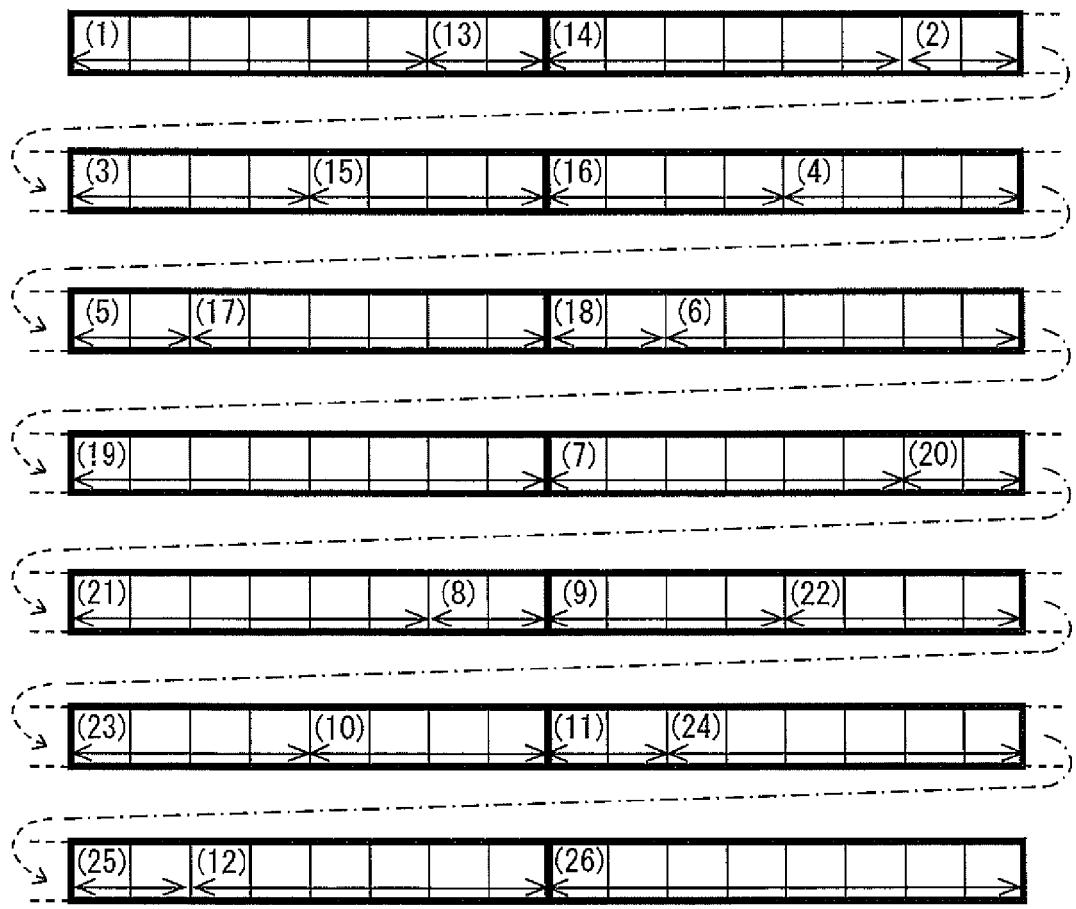
FIG. 12B is a diagram for explaining memory accesses when image blocks are not concatenated.

FIG. 12A is a diagram for explaining which pixels in each block are transferred in a single burst operation when the blocks B11 and B12 are not concatenated. FIG. 12B is a diagram for explaining which pixels in each block are written in a single burst transfer when the blocks B11 and B12 are not concatenated. FIGS. 12A and 12B both assume the case in which the number, n, of columns of blocks 62 is two. The same applies to FIGS. 13A and 13B to be described later.

In FIGS. 12A and 12B, the pixel data ranges indicated by double-headed arrows with parenthesized numbers (1) to (26) each represent the range of pixels to be transferred in a single burst operation. In FIG. 12B, the address space of the first image memory 12 is divided into segments, as indicated by thick lines, each segment indicating the range to be accessed in a single burst transfer. The same applies to FIG. 13B to be described later.

For example, the pixel data designated in the block B11 by the parenthesized number (1) is written to the first six bytes in the first image memory 12. That is, this pixel data is written to the first six bytes in one segment within the first image memory 12. As a result, in the immediately succeeding burst transfer, only two bytes of data designated in the block B12 by the parenthesized number (13) can be transferred.

Likewise, after the pixel data designated in the block B12 by the parenthesized number (14) has been transferred, only two bytes of data designated in the block B11 by the parenthesized number (2) can be transferred.

In this way, when the blocks B11 and B12 are not concatenated, the chance of burst transferring data shorter in length than the burst length increases. As a result, the chance of burst transferring data in burst lengths decreases, and the number of memory accesses increases. In the illustrated example, a total of 26 memory accesses are performed to transfer all the pixel data in the blocks B11 and B12.

Figure 13A:
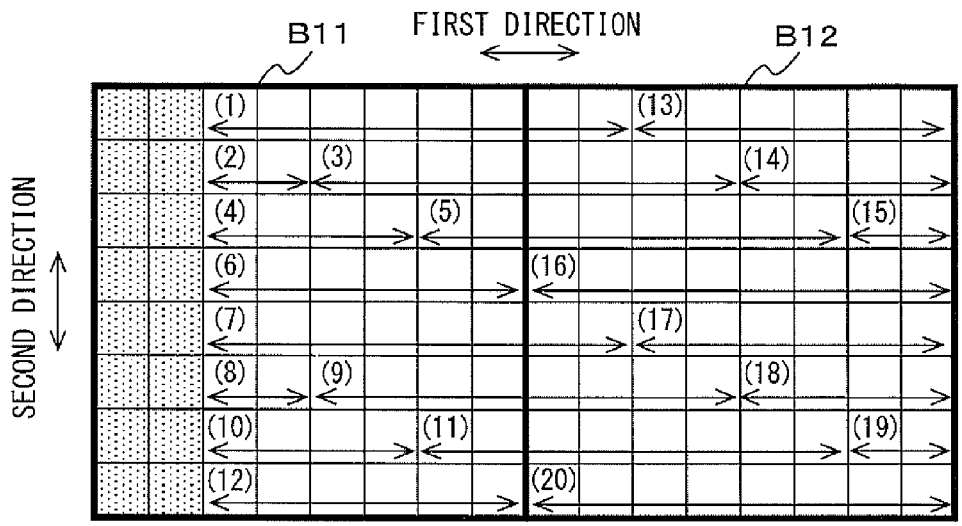
FIG. 13A is a diagram for explaining memory accesses when image blocks are concatenated.
Figure 13B:
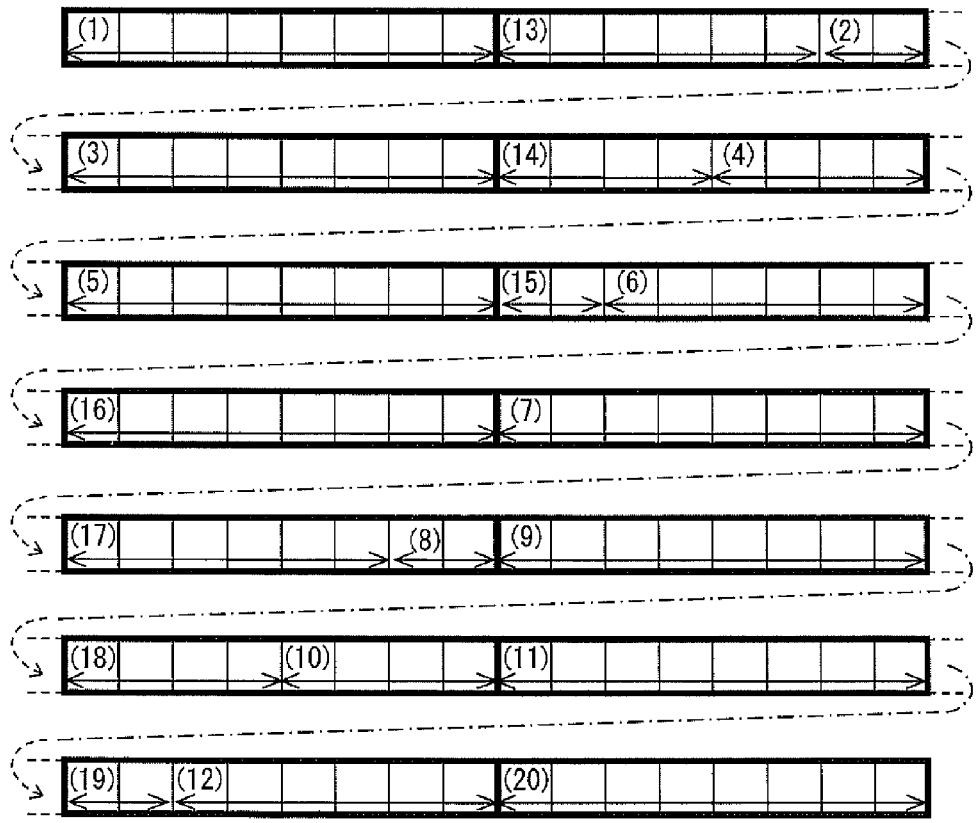
FIG. 13B is a diagram for explaining memory accesses when image blocks are concatenated.

FIG. 13A is a diagram for explaining which pixels in each block are transferred in a single burst operation when the blocks B11 and B12 are concatenated. FIG. 13B is a diagram for explaining which pixels in each block are written in a single burst transfer when the blocks B11 and B12 are concatenated.

In each of the ranges designated by parenthesized numbers (1), (3), (5), (7), (9), and (11), the pixel data of the burst length arranged contiguously across the blocks are transferred in a single burst operation. As a result, the chance of burst transferring data in burst lengths increases, and the number of memory accesses decreases. In the illustrated example, all of the pixel data in the blocks B11 and B12 are transferred with 20 memory accesses.

6. Image Processing Involving Image Rotation

Figure 14A:
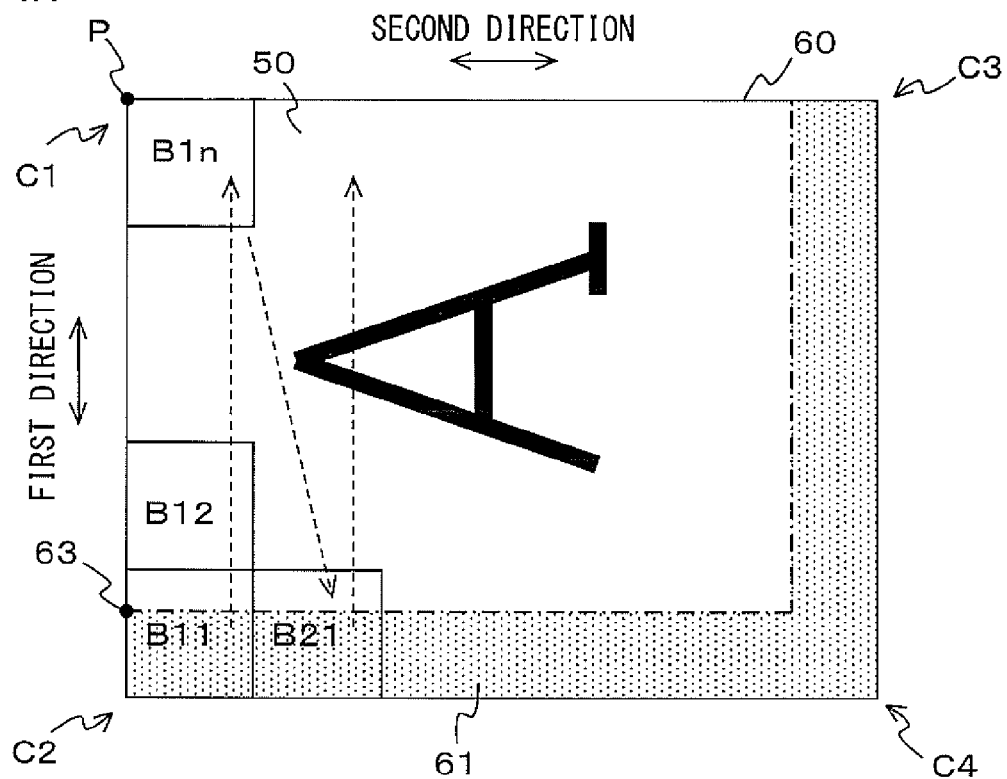
FIG. 14A is a diagram for explaining the block reading order when image processing involves 90-degree right rotation.
Figure 14B:
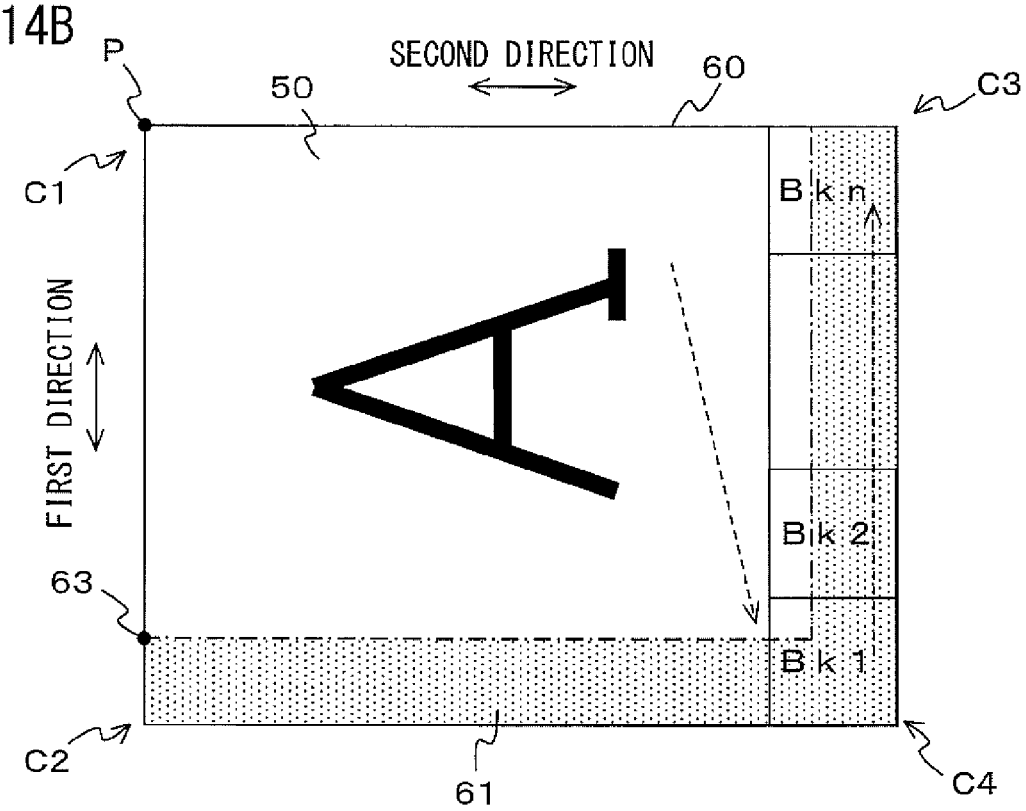
FIG. 14B is a diagram for explaining the block reading order when image processing involves 90-degree right rotation.

Next, a description will be given of an example of how the block 62 is burst transferred into the first image memory 12 when the image processing performed by the image processing unit 34 involves image rotation. FIGS. 14A and 14B are diagrams for explaining one example of the order in which the blocks are read out when the image processing involves 90-degree right rotation.

In the following description, of the four corners of the image data 50, the corner at which the starting pixel P of the image data 50 is located is designated as the first corner C1. The corner located opposite the first corner C1 in the first direction is designated as the second corner C2. The corner located opposite the first corner C1 in the second direction is designated as the third corner C3. The corner diagonally opposite the first corner C1 is designated as the fourth corner C4.

Since the image data 50 is rotated to the left by 90 degrees relative to the original document, the image processing performed by the image processing unit 34 involves 90-degree right rotation. In this case, the pixel data 63 corresponding to the starting pixel of the image data 70 after the image processing is located near the second corner C2.

Therefore, the reading module 33 first reads out the block B11 in the first row and first column that contains the second corner C2. Then, the reading module 33 sequentially reads out the blocks B12 to B1n arranged contiguously along the first direction from the second corner C2 to the first corner C1.

After reading out the blocks B11 to B1n in the first row, the reading module 33 sequentially reads out the blocks B21 to B2n in the second row starting from the block B21 located adjacent to the block B11 in the second direction. After that, the reading module 33 reads out the blocks in each subsequent row in like manner until the blocks Bk1 to Bkn in the kth row are finally read out.

The margin data 61 in the first direction is contained in the blocks B11 to Bk1 in the first column. The margin data 61 in the second direction is contained in the blocks Bk1 to Bkn in the kth row. In the following description, it is assumed that the number of pixels in the first direction of the margin data 61 is two. It is also assumed that the number of pixels in the second direction of the margin data 61 is five.

Figure 15:
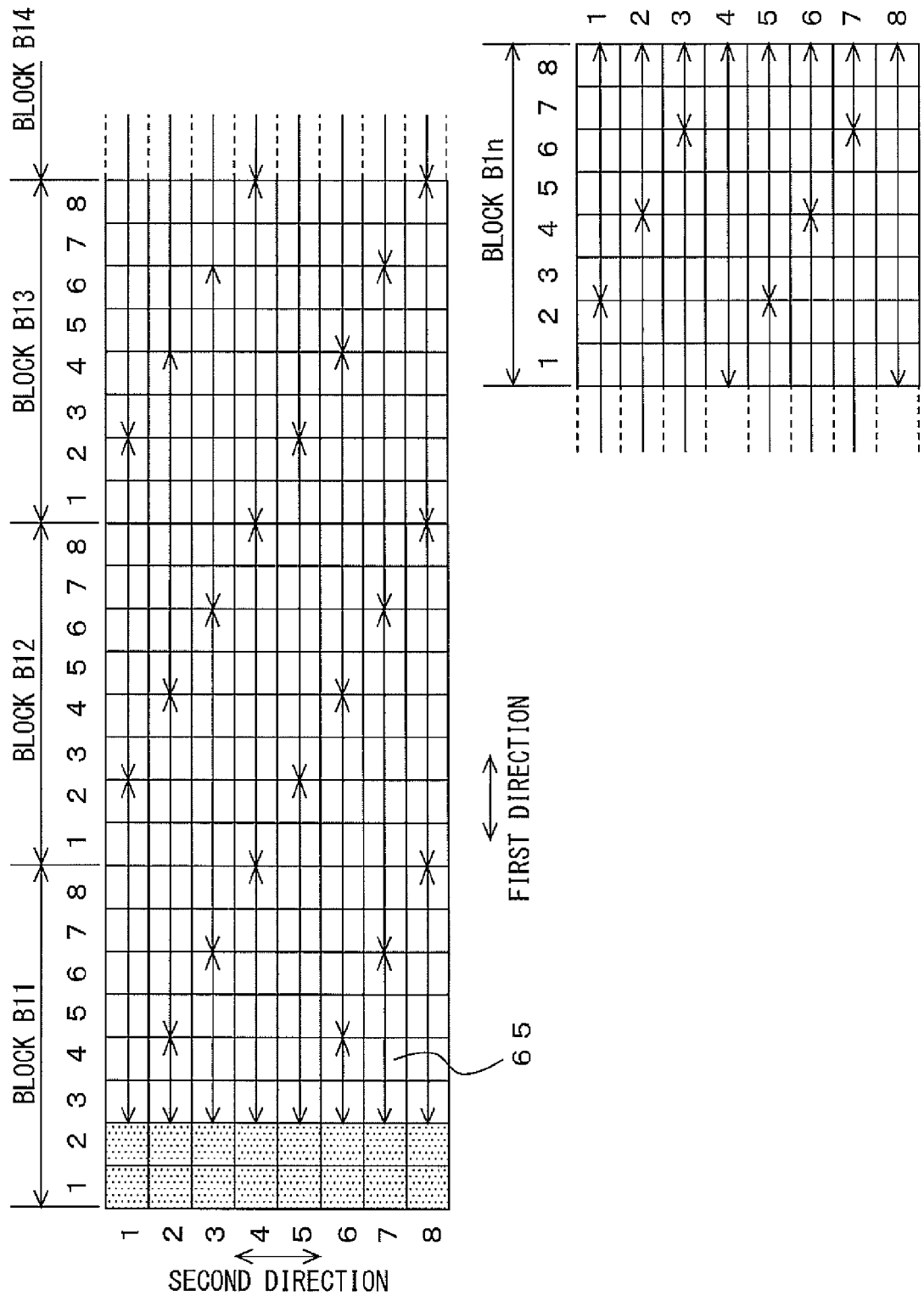
FIG. 15 is a diagram for explaining pixel ranges to be burst transferred in blocks B11 to B1n read out in FIG. 14A.

FIG. 15 is a diagram for explaining an example of how the blocks B11 to B1n are read out in FIG. 14A. The numbers 1 to 8 appearing alongside each of the blocks B11 to B1n indicate the positions of the eight pixels arranged in the first direction in the corresponding block. The numbers 1 to 8 appearing on the left side of the block B11 indicate the positions of the eight pixels arranged in the second direction in each of the blocks B11 to B1n. The same applies to FIGS. 16, 18, and 19 to be described later.

In the following description, the position of each particular pixel is specified by a combination of the block 62, the pixel position in the first direction, and the pixel position in the second direction in FIG. 15. For example, the position of the pixel 65 is specified as (block B11, 4, 7).

In FIG. 15, double-headed arrows shown in the blocks B11 to B1n each represent the range of pixels to be transferred in a single burst operation. The same applies to FIGS. 16, 18, and 19 to be described later.

From the image data of the block B11, the writing module 36 transfers the data other than the margin data 61 located on the line starting end side. As a result, the first fractional data and the second fractional data occur in the block B11 and the block B1n, respectively. For example, the pixel data between (block B11, 3, 2) and (block B11, 4, 2) is an example of the first fractional data to be burst transferred in two bytes. The pixel data between (block B1n, 3, 1) and (block Bin, 8, 1) is an example of the second fractional data to be burst transferred in six bytes.

On the other hand, the pixel data in the intermediate blocks B12 to B1(n−1) are all burst transferred in burst lengths. For example, the pixel data of the burst length, arranged continuously from (block B12, 5, 2) to (block 13, 4, 2) across the blocks B12 and B13, is burst transferred in a single operation.

FIG. 16 is a diagram for explaining an example of how the blocks Bk1 to Bkn are read out in FIG. 14B. As in FIG. 15, from the image data of the block Bk1, the writing module 36 transfers the data other than the margin data 61 located on the line starting end side. As a result, the first fractional data and the second fractional data occur in the block Bk1 and the block Bkn, respectively. On the other hand, the pixel data in the intermediate blocks Bk2 to Bk(n−1) are all burst transferred in burst lengths.

Since the pixel data in the last five lines in each of the blocks Bk1 to Bkn are margin data 61, the writing module 36 transfers the data in the lines other than the last five lines.

Figure 17A:
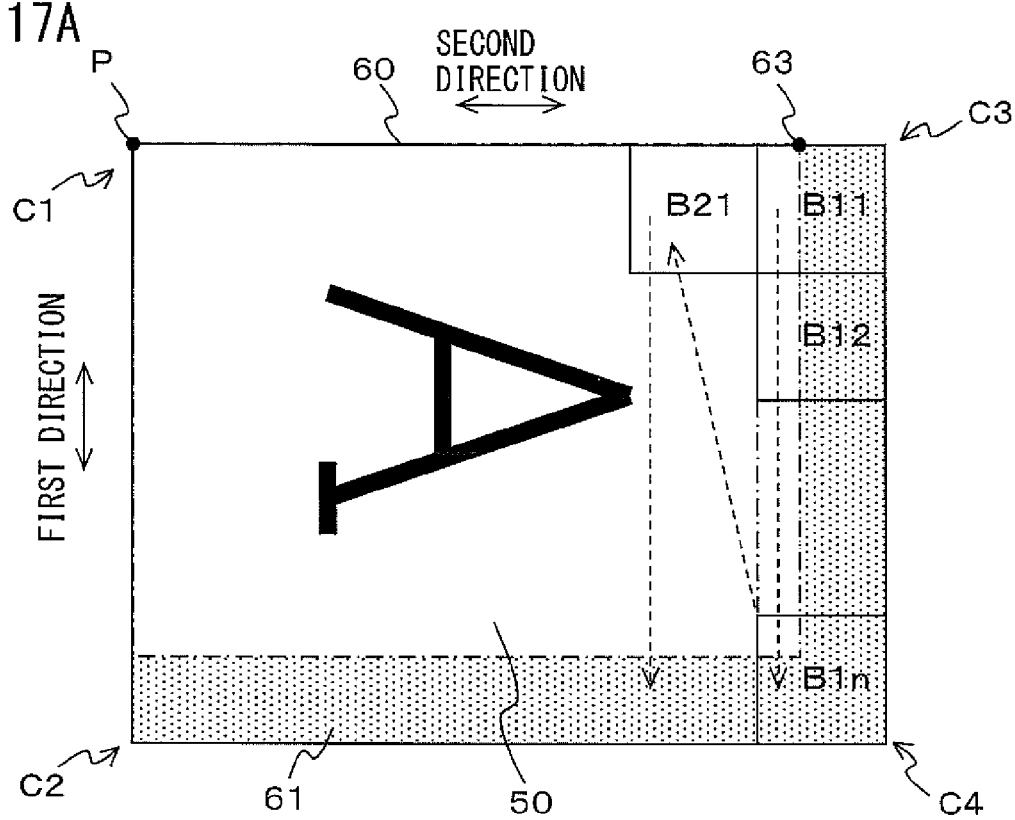
FIG. 17A is a diagram for explaining the block reading order when image processing involves 90-degree left rotation.
Figure 17B:
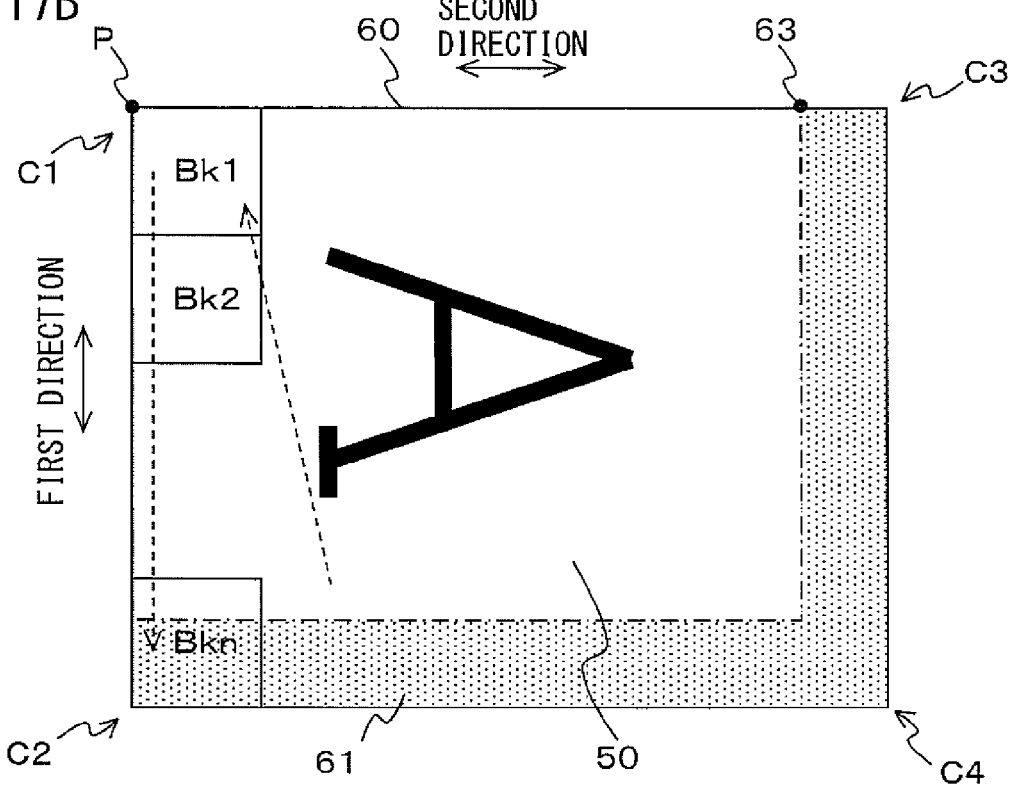
FIG. 17B is a diagram for explaining the block reading order when image processing involves 90-degree left rotation.

FIGS. 17A and 17B are diagrams for explaining one example of the order in which the blocks are read out when the image processing involves 90-degree left rotation. Since the image data 50 is rotated to the right by 90 degrees relative to the original document, the image processing performed by the image processing unit 34 involves 90-degree left rotation. In this case, the pixel data 63 corresponding to the starting pixel of the image data 70 after the image processing is located near the third corner C3.

Therefore, the reading module 33 first reads out the block B11 in the first row and first column that contains the third corner C3. Then, the reading module 33 sequentially reads out the blocks B12 to B1n arranged contiguously along the first direction from the third corner C3 to the fourth corner C4.

After reading out the blocks B11 to B1n in the first row, the reading module 33 sequentially reads out the blocks B21 to B2n in the second row starting from the block B21 located adjacent to the block B11 in the second direction. After that, the reading module 33 reads out the blocks in each subsequent row in like manner until the blocks Bk1 to Bkn in the kth row are finally read out. The margin data 61 in the first direction is contained in the blocks B1n to Bkn in the nth column. The margin data 61 in the second direction is contained in the blocks B11 to B1n in the first row.

FIG. 18 is a diagram for explaining an example of how the blocks B11 to B1n are read out in FIG. 17A. Since the pixel data in the first five lines in each of the blocks B11 to B1n are margin data 61, the writing module 36 transfers the data in the lines other than the first five lines.

From the image data of the block Bin, the writing module 36 transfers the data other than the margin data 61 located on the line terminating end side. As a result, the first fractional data and the second fractional data occur in the block B11 and the block B1n, respectively. On the other hand, the pixel data in the intermediate blocks B12 to B1(n−1) are all burst transferred in burst lengths.

FIG. 19 is a diagram for explaining an example of how the blocks Bk1 to Bkn are read out in FIG. 17B. As in FIG. 18, from the image data of the block Bkn, the writing module 36 transfers the data other than the margin data 61 located on the line terminating end side. As a result, the first fractional data and the second fractional data occur in the block Bk1 and the block Bkn, respectively. On the other hand, the pixel data in the intermediate blocks Bk2 to Bk(n−1) are all burst transferred in burst lengths.

Figure 20:
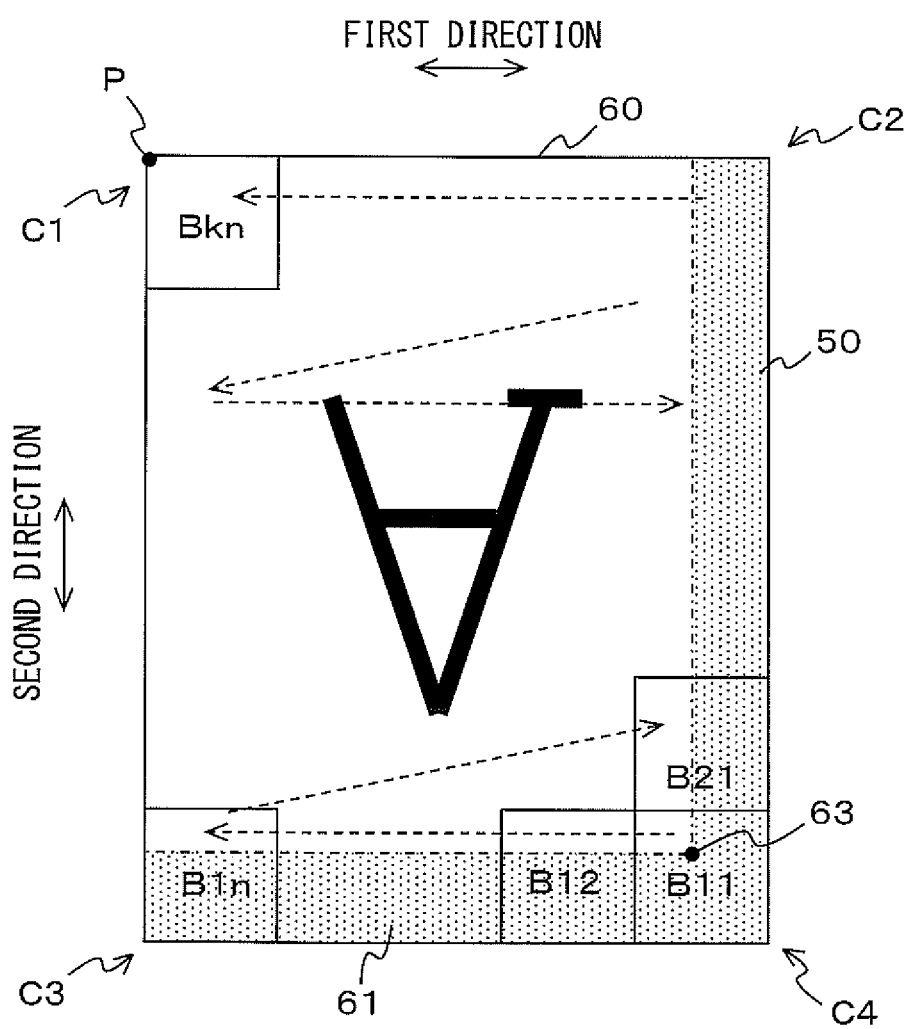
FIG. 20 is a diagram for explaining the block reading order when image processing involves 180-degree rotation.

FIG. 20 is a diagram for explaining one example of the order in which the blocks are read out when the image processing involves 180-degree rotation. Since the image data 50 is rotated by 180 degrees relative to the original document, the image processing performed by the image processing unit 34 involves 180-degree rotation. In this case, the pixel data 63 corresponding to the starting pixel of the image data 70 after the image processing is done is located near the fourth corner C4.

The reading module 33 first reads out the block B11 in the first row and first column that contains the fourth corner C4. Then, the reading module 33 sequentially reads out the blocks B12 to B1n arranged contiguously along the first direction from the fourth corner C4 to the third corner C3.

After reading out the blocks B11 to B1n in the first row, the reading module 33 sequentially reads out the blocks B21 to B2n in the second row starting from the block B21 located adjacent to the block B11 in the second direction. After that, the reading module 33 reads out the blocks in each subsequent row in like manner until the blocks Bk1 to Bkn in the kth row are finally read out.

The margin data 61 in the first direction is contained in the blocks B11 to Bk1 in the first column. This margin data 61 is located on the line starting end side, as in the case of the image rotated 90 degrees to the right shown in FIGS. 14A and 14B. As in FIGS. 15 and 16, in the image data contained in each of the blocks B11 to Bk1, the writing module 36 transfers only the image data other than the margin data 61 located at the line starting end side.

The margin data 61 in the second direction is contained in the blocks B11 to B1n in the first row. This margin data 61 is contained in the first five lines in each of the blocks B11 to B1n, as in the case of the image rotated 90 degrees to the right shown in FIGS. 17A and 17B. As in FIG. 18, in the image data contained in each of the blocks B11 to B1n, the writing module 36 transfers only the pixel data other than the data in the first five lines.

7. Modified Example

The buffer memory 35 may include a third storage area for holding the pixel data of the starting block Bj1 until the last block Bjn in the jth row has been transferred into the first image memory 12. Then, the writing module 36 may transfer the first fractional data of the starting block Bj1 held in the third storage area and the second fractional data occurring from the last block Bjn into the first image memory 12 in a single burst operation.

Explanation will be given by using the blocks B11 to B1n in FIG. 15 as an example. The writing module 36 may transfer the two-byte first fractional data occurring between (block B11, 3, 2) and (block B11, 4, 2) in the block B11 and the six-byte second fractional data occurring between (block B1n, 3, 1) and (block B1n, 8, 1) in the block B1n into the first image memory 12 in a single burst operation. By burst transferring the first fractional data and the second fractional data in a single burst operation, the chance of burst transferring data in burst lengths increases.

While the starting block Bj1 in the jth row and the last block B(j−1)n in the immediately preceding row are both being held in the buffer memory 35, the first fractional data in the first line of the block Bj1 and the second fractional data in the last line of the block B(j−1)n may be transferred in a single burst operation. By transferring the first fractional data in the first line of the block Bj1 and the second fractional data in the last line of the block B(j−1)n in a single burst operation, the chance of burst transferring data in burst lengths increases.

According to the image data processing apparatus and the image data processing method, and the computer-readable, non-transitory medium, there is the effect of increasing the chance of burst transferring data in burst lengths when writing image data into memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image data processing apparatus comprising:
   a storage device for storing a first pixel block and a second pixel block taken from image data in which pixels are arranged in a first direction and a second direction which is different from the first direction; and
   a first module for writing the first pixel block and the second pixel block stored in the storage device into a memory, wherein
   the first pixel block and the second pixel block are arranged one adjacent to the other along the first direction, and the number of pixels arranged in the first direction in each block is equal to an access unit data length of the memory multiplied by a natural number m1, and
   the first module writes pixel data equal in length to the access unit data length, which represents pixels contiguously arranged along the first direction across the first and second pixel blocks, into the memory in a single memory access operation.

2. The image data processing apparatus according to claim 1, wherein
   the image data contains margin pixels that make the number of pixels in the first direction of the image data equal to the access unit data length multiplied by a natural number (m1×n), and
   the first module writes pixel data representing other than margin pixels in a first column of the image data defined along the first direction and pixel data representing other than margin pixels in a second column adjacent to the first column to contiguous addresses in the memory.

3. The image data processing apparatus according to claim 1, further comprising a second module for accessing the memory and successively reading out the first pixel block and the second pixel block arranged one adjacent to the other along the first direction, and storing the first pixel block and the second pixel block in the storage device, and
   wherein the first module writes an array of pixels arranged along the first direction to contiguous addresses in the memory.

4. The image data processing apparatus according to claim 3, wherein the second module reads out the array of pixels arranged along the first direction of the image data from the contiguous addresses in the memory.

5. The image data processing apparatus according to claim 1, further comprising a second module for accessing the memory to read out the first pixel block and the second pixel block arranged one adjacent to the other along the first direction, and storing the first pixel block and the second pixel block in the storage device, and wherein
   the image data contains margin pixels that make the number of pixels in the second direction of the image data equal to the access unit data length multiplied by a natural number (m2×k),
   the number of pixels arranged in the second direction in each of the first and second pixel blocks is equal to the access unit data length multiplied by a natural number m2,
   the second module reads out an array of pixels arranged along the second direction of the image data from contiguous addresses in the memory, and
   the first module applies a rotation to the image data by writing an array of pixels arranged along the first direction of the image data to contiguous addresses in the memory.

6. The image data processing apparatus according to claim 5, wherein the second module accesses the memory and successively reads out the first pixel block and the second pixel block arranged one adjacent to the other along the first direction.

7. An image data processing method comprising:
   storing in a storage device a first pixel block and a second pixel block taken from image data in which pixels are arranged in a first direction and a second direction which is different from the first direction; and writing, by a computer, the first pixel block and the second pixel block stored in the storage device into a memory, wherein the first pixel block and the second pixel block are arranged one adjacent to the other along the first direction, and the number of pixels arranged in the first direction in each block is equal to an access unit data length of the memory multiplied by a natural number m1, and pixel data equal in length to the access unit data length, which represents pixels contiguously arranged along the first direction across the first and second pixel blocks, are written into the memory in a single memory access operation.

8. A computer-readable, non-transitory medium storing a computer program, wherein the computer program causes a computer to execute a process, the process comprising:

storing in a storage device a first pixel block and a second pixel block taken from image data in which pixels are arranged in a first direction and a second direction which is different from the first direction; and writing the first pixel block and the second pixel block stored in the storage device into a memory, wherein the first pixel block and the second pixel block are arranged one adjacent to the other along the first direction, and the number of pixels arranged in the first direction in each block is equal to an access unit data length of the memory multiplied by a natural number m1, and pixel data equal in length to the access unit data length, which represents pixels contiguously arranged along the first direction across the first and second pixel blocks, are written into the memory in a single memory access operation.

\* \* \* \* \*